United States Patent [19]

Dusheck, Jr. et al.

[11] 4,228,395

[45] Oct. 14, 1980

[54] FEATURE RECOGNITION SYSTEM

[75] Inventors: George J. Dusheck, Jr., Cinnaminson; Phillips B. Scott, Haddonfield, both of N.J.

[73] Assignee: The United States of America as represented by the Secretary of the Navy, Washington, D.C.

[21] Appl. No.: 795,392

[22] Filed: Jan. 6, 1969

[51] Int. Cl.$^3$ ............................................. G01R 23/16
[52] U.S. Cl. .................. 324/77 B; 324/331; 324/77 R
[58] Field of Search ................ 324/77 B, 77 D, 77 E, 324/77 F, 77 R, 331; 179/1 SA; 340/146.3

[56] References Cited

U.S. PATENT DOCUMENTS

| 3,310,784 | 3/1967 | Hilinski | 324/77 |
| 3,453,540 | 7/1969 | Dusheck | 324/77 |

Primary Examiner—Malcolm F. Hubler
Attorney, Agent, or Firm—Edgar J. Brower; Henry Hansen

[57] ABSTRACT

An airborne system for automatically and electronically recognizing and detecting the relative presence of invariant features of a transient submarine signal occurring in the presence of signal-like noise. A plurality of comb filters receive MAD signal information in the amplitude-time domain and filter it to provide amplitude-time-frequency domain information. The primary features (positive and negative slopes) of this latter information are then abstracted, the abstracted information being utilized in a signal processor to detect and recognize the relative presence of invariant, submarine recognition features. Upon recognition, a decision thereof is routed to a visual display.

17 Claims, 19 Drawing Figures

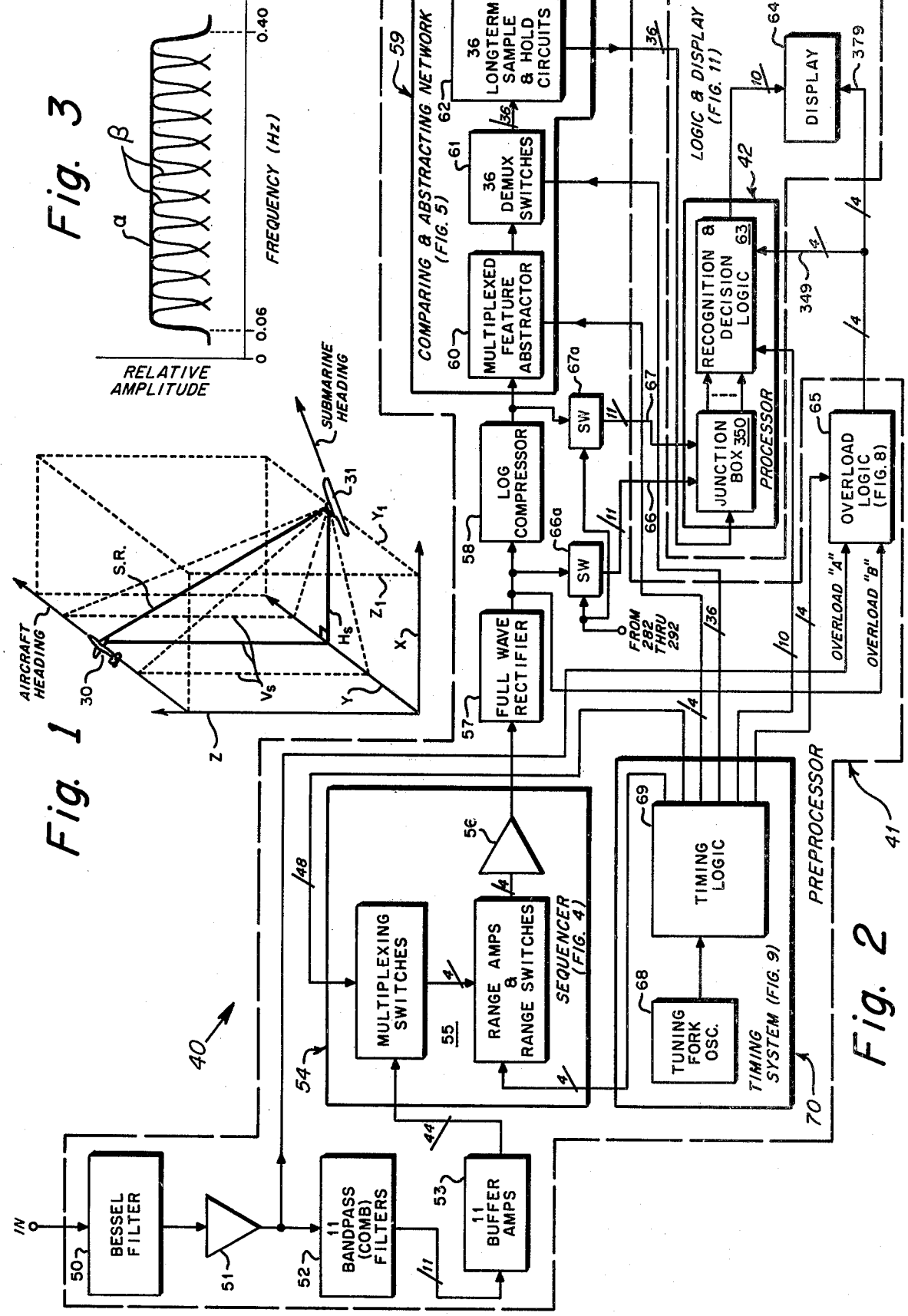

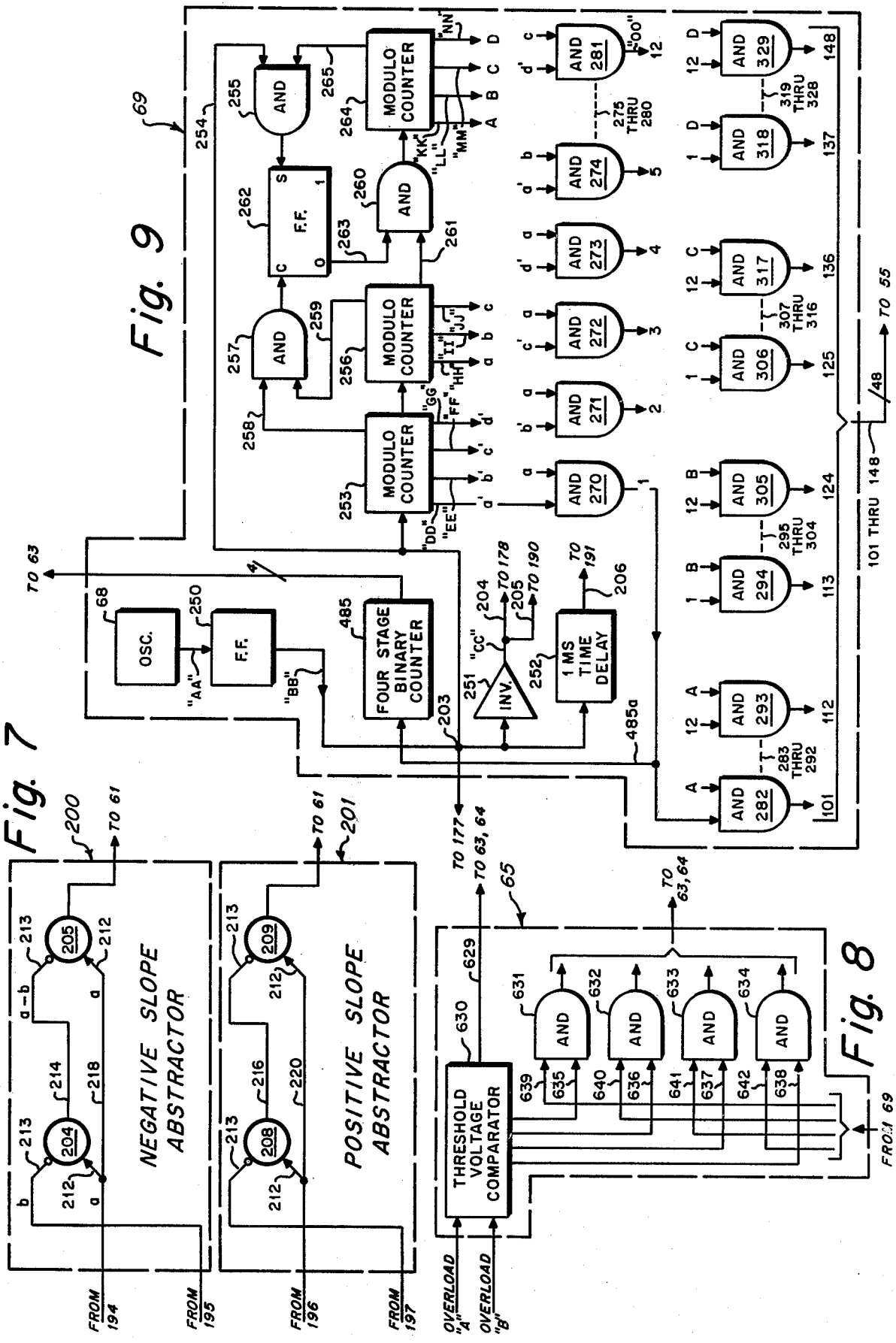

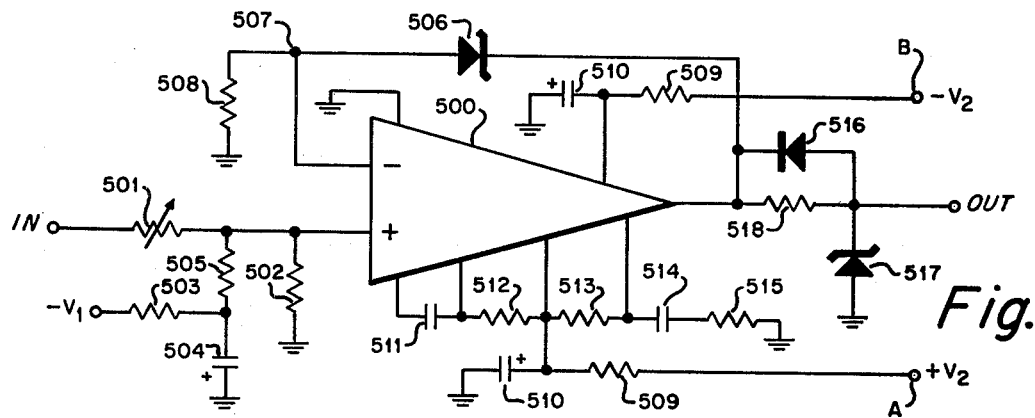
Fig. 16
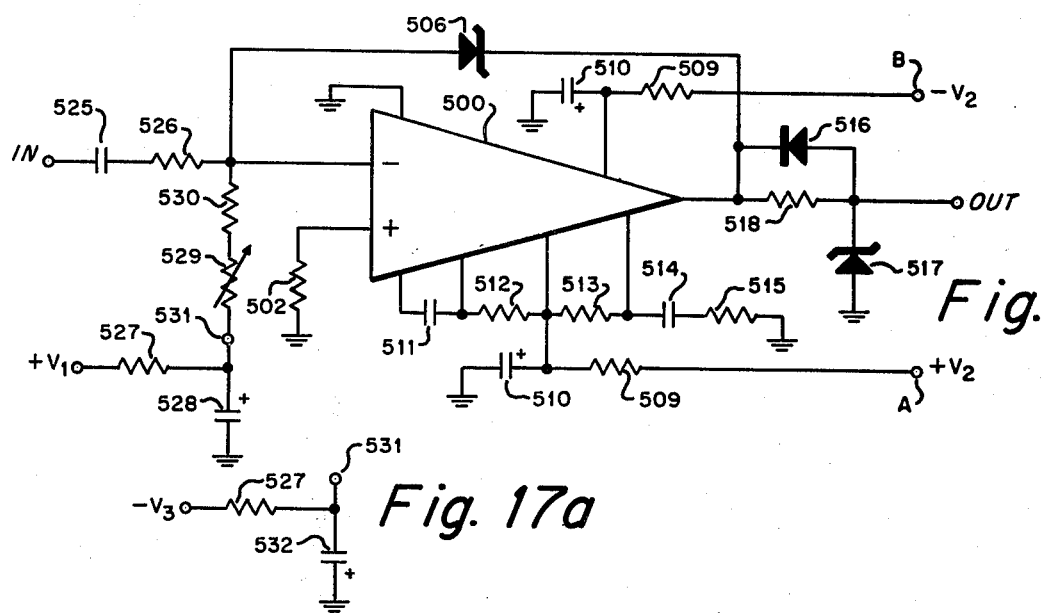
Fig. 17
Fig. 17a
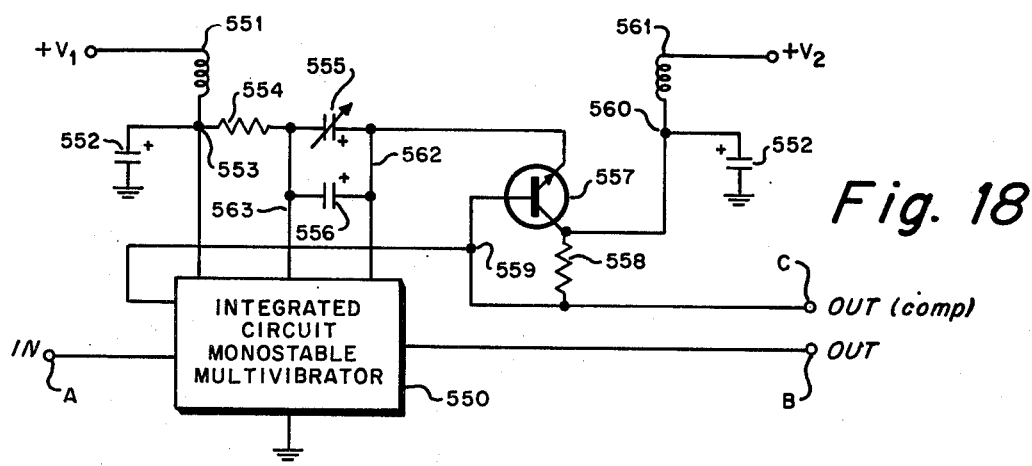
Fig. 18

FEATURE RECOGNITION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a feature recognition system and more particularly to a system for processing transient submarine signals which occur in the presence of signal-like noise and for recognizing certain relatively invariant features exhibited by the submarine signals and not by the noise signals.

In the field of submarine detection and recognition, magnetic anomaly detection (MAD) devices and techniques have long been utilized. Basically, MAD is an airborne system employing magnetometer elements which sense the presence of a submerged submarine by measuring the small distortion in the earth's magnetic field caused thereby. This technique is an exacting one as the earth's magnetic field intensity may be on the order of 10,000 times stronger than that of the submarine. Additionally, the high altitudes of the aircraft, or more exactly the long slant ranges to the submarine, cause the signals from the submarine to virtually disappear into the noise background. This noise is derived from a multiplicity of sources as from, for example, the magnetometer sensing element itself, the magnetic and electrical equipments of the aircraft, large magnetic fields external to the aircraft such as geologic mineral deposits beneath the ocean floor, and other phenomena.

Due to these many noise sources and the distance between sensor and submarine, the submarine signal is either completely disguised by the noise such that it cannot be recognized therefrom or the noise signals themselves produce a response similar to the submarine signals such that false recognitions are effectuated.

Prior art systems incorporated a trained human operator who memorized features or patterns known to be representative of the signature of a submarine and whose function it was to visually recognize and extract these submarine signals from data displayed before him. The accuracy of such a technique was relatively low and varied with the individual operator. In addition, all of the operators fatigued with time thus further decreasing accuracy. The result was that many false alarms were indicated and many actual targets were entirely missed.

Thus there arose a need for a system capable of automatically and electronically recognizing and detecting, with a high degree of accuracy and reliability, submarine signals occurring in the presence of signal-like noise.

SUMMARY OF THE INVENTION

Accordingly, it is the general purpose of the present invention to provide a feature recognition system which fulfills the need for a highly accurate, fully automatic submarine detection system. The present invention operates upon incoming MAD signals containing both submarine signals and signal-like noise, by abstracting the primary features or positive and negative slopes thereof, and by utilizing and processing these primary features to recognize and detect relatively invariant submarine signals therefrom.

The invention is divided into two major functional areas, the preprocessor system and the processor or signal recognition and detection system. The preprocessor receives MAD amplitude-time domain information (i.e., varying amplitude signals in the time domain) and passes them through a plurality of filter channels each having a different bandwidth and center frequency to provide time waveforms in the amplitude-time-frequency domain (i.e., signals varying in both amplitude and frequency but having the same time base as the received MAD signals). Thereafter, the preprocessor both prepares the amplitude-time-frequency domain primary signals for (slope) feature abstraction and actually performs the feature abstraction operation. The processor receives the primary feature abstracted signals and detects and recognizes therefrom the relative presence of invariant submarine signals or features as a function of degree of probability of detection and slant range from airborne feature recognition system to submerged submarine.

More definitively, the preprocessor comprises a plurality of electrical channels each of which includes a comb filter having a predetermined "Q" and passband positioned within the passband of a Bessel filter which receives the raw, input analog MAD signals from magnetometer sensing elements. The comb filters are connected through buffer amplifiers to a multiplexing sequencer having four operational amplifiers therein of separate predetermined gain, each of which is representative of a range of slant ranges.

Upon passing through each of the four ranges, the MAD signals are combined in a summing amplifier of unity gain, full-wave rectified, and log compressed. Thereafter, the MAD signals are supplied to a multiplexed feature abstractor which obtains signal differences between adjacent comb filter channels and thereby obtains positive and negative slope (primary feature) information. This slope information is supplied to a plurality of demultiplexing switches (which, like many of the other system components, are controlled by timing logic) which feed the information to a like plurality of long term sample and hold circuits. The information thus derived is fed into the processor along with a portion of the MAD signal tapped off at points before the feature abstractor.

The processor comprises a plurality of recognition logic networks, each network including a number of logic circuits and each logic circuit per range being representative of a particular probability of detection as determined from empirical data, test results, and analysis. After the information is processed, if it satisfies the particular range criteria for the particular probability of detection for that range it is displayed thereby indicating a detected target (i.e., a submarine) with a degree of certainty equal to the degree of probability for the range. Overload logic is connected within the preprocessor portion of the system and serves to indicate the impossibility of a target regardless of the presence of invariant features. Timing for the various sequences of events is accomplished through the use of a precision timing fork oscillator and associated timing logic circuitry.

BRIEF DESCRIPTION OF THE DRAWING

FIG. 1 is a pictorial representation of a typical search situation;

FIG. 2 is a block diagram of the overall system showing the preprocessor and processor in accordance with the invention;

FIG. 3 is a graph showing the passbands of the Bessel filter and comb filters of FIG. 2;

FIG. 7 is a schematic representation of the positive and negative slope abstractors of the multiplexed feature abstractor of FIG. 5;

FIG. 8 is a block diagram of the overload logic of FIG. 2;

FIG. 9 is a block diagram of the timing logic for the overall system of FIG. 2;

FIG. 16 is a schematic diagram of a level detector used in a recognition logic of FIG. 11;

FIG. 17 is a schematic diagram of an "OFF" transition detector used in the recognition logic of FIG. 11;

FIG. 17a is a schematic diagram showing a modification of FIG. 17 such that the detector thereof may be made "ON" responsive; and FIG. 18 is a schematic diagram of an output one-shot used in the recognition logic of FIG. 11.

DESCRIPTION OF THE PREFERRED EMBODIMENT

Figure 4:
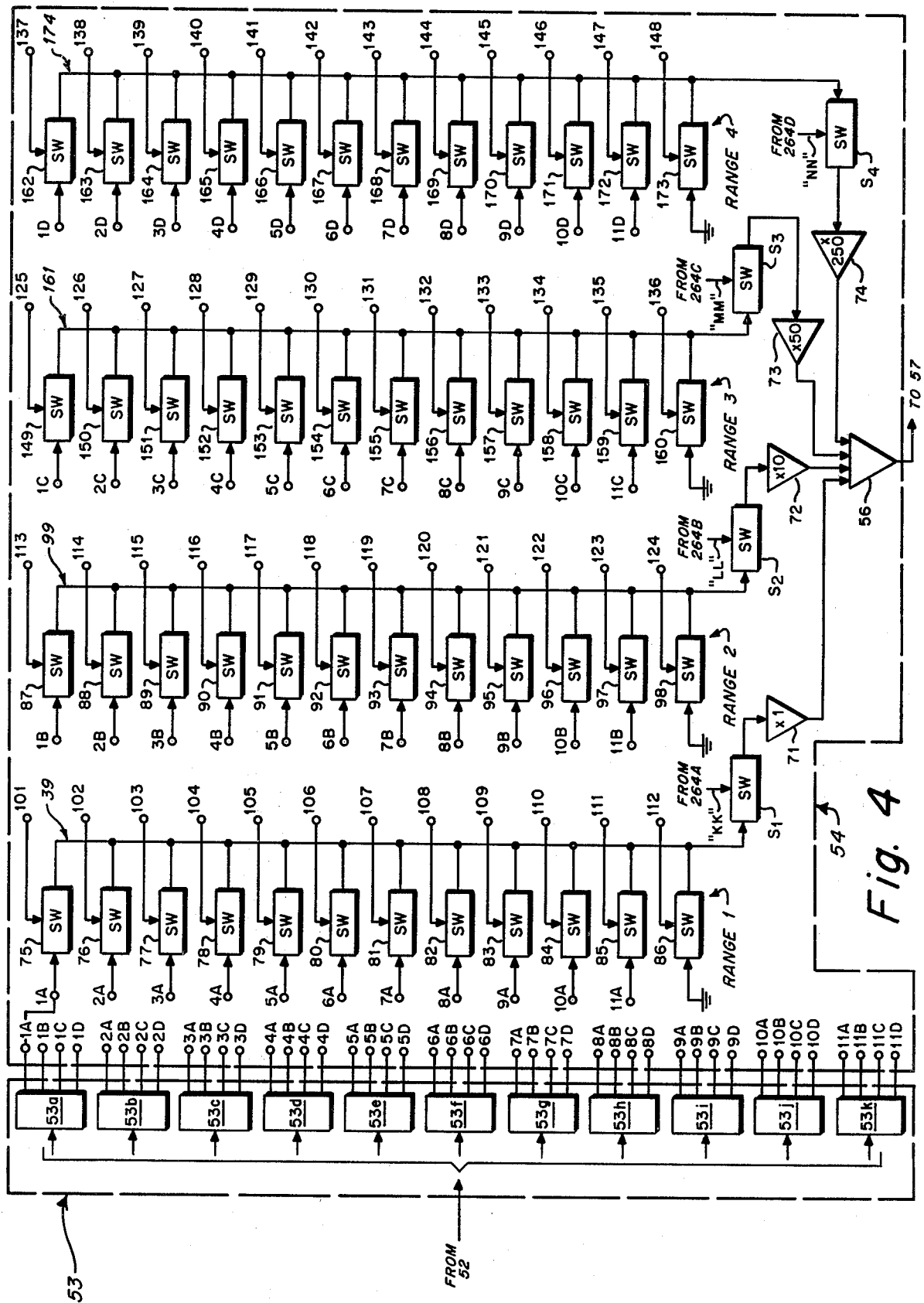
FIG. 4 is a more detailed block diagram of the multiplexing sequencing switches and range amplifiers of FIG. 2.

Referring now to the drawing and more particularly to FIG. 1 thereof, a typical search situation is shown wherein an aircraft 30 (in which is housed the feature recognition system in accordance with the invention) is maneuvering in level flight along a particular heading or aircraft track in search of a submerged submarine 31 moving along its own heading under water. As shown, the XYZ coordinate axes are defined in order that the submarine 31 is positioned and moving within the XY plane. Therefore, the perpendicular distance between the aircraft and submarine lies along the Z axis. This distance is known as the vertical separation and is equal to the sum of the search altitude (the perpendicular distance from aircraft to water surface) and the depth of the submarine. If the aircraft 30 is in straight and level flight and the submarine 31 is moving at a constant depth (as is generally the case) the vertical separation $V_s$ is constant.

As the aircraft flies along its heading there occurs a point at which the distance from the submarine 31 to the projection of the aircraft heading on XY plane is a minimum. This minimum distance is the horizontal separation, $H_s$. At this point the line $H_s$ is perpendicular to the YZ plane (and hence perpendicular to $V_s$). Alternatively stated, $H_s$ is the perpendicular distance between the YZ plane (which contains $V_s$) and a plane $Y_1Z_1$, a plane passed through the submarine 31 and parallel to the plane YZ. With $H_s$ perpendicular to $V_s$ the distance from aircraft to submarine is also minimum. This is called the slant range SR, and is the closest or shortest line of approach.

If, as is generally the case, the submarine 31 is assumed to be a magnetic dipole, then the shape of the anomaly signal therefrom will be a function of the dip angle (position on the earth's surface), the magnetic heading (with respect to magnetic north) of the aircraft, the magnetic heading of the submarine dipole, the horizontal separation of the submarine from the aircraft, and the vertical separation of the submarine from the aircraft. Given these parameters the feature recognition system can detect from amid signal-like noise the relative presence of a submerged submarine.

Feature Recognition System

Referring now to FIG. 2 there is shown a feature recognition system 40. The system 40 comprises a preprocessing system 41 and a processing system 42. Magnetic fields (possibly containing a submarine anomaly signal) are sensed by magnetometer elements (not shown), converted to electrical energy, and fed to the preprocessor 41. The preprocessor 41 includes at its input a Bessel filter 50 having a passband of 0.06 Hz to 0.40 Hz. It has been found from prior empirical investigation of accumulated data that most MAD signal energy occurs within this range. This filter thus eliminates that energy below 0.06 Hz and above 0.40 Hz. From the output of the Bessel filter 50 the remaining MAD signal energy is fed to a driver amplifier 51 which may comprise an integrated circuit and which provides isolation between the Bessel filter output and the inputs to eleven bandpass or comb filters 52. Each of these bandpass filters 52 is a narrow, comb filter having a separate center frequency such that each of the respective passbands thereof fits within the passband of the Bessel filter 50 (thus resembling the teeth of a comb). This can be seen in FIG. 3 wherein curve "α" represents the passband of Bessel filter 50 and curve "β" represents the passbands of the respective comb filters 52. The function of the bandpass filters 52 is to break the MAD signal energy down into smaller frequency constituents thereby to facilitate the measurement of energy changes and/or transitions in the frequency domain.

The outputs from each of the eleven bandpass filters 52 are connected to respective buffer amplifiers 53 which function to isolate the filters 52 from a multiplexing sequencer 54, discussed in detail with respect to FIG. 4. Each of the buffer amplifiers 53 has four output terminals. Accordingly, forty-four wires lead from the eleven buffer amplifiers 53 (four per amplifier) to a multiplicity of multiplexing switches and range amplifiers 55. These connections will be discussed in detail hereinafter also with respect to FIG. 4. There are four outputs from the multiplexing switches and range amplifiers 55, one output for each of four different ranges. Each of these outputs is fed into a summing amplifier of unity gain 56. The output of the summing amplifier 56 is connected to a full-wave rectifier 57 which, in turn, is connected at its output to a log compressor 58. The log compressor 58 functions to compress the dynamic range of the MAD signal energy to a range sufficiently small such that the electronic equipments of the system can operate within the linear portions thereof. This is necessary because the dynamic range of the input MAD signal energy is excessive (on the order of 80 db) and would saturate the electronics if not log compressed. The use of a log compressor also provides a measure of amplitude insensitivity with respect to the features. Full-wave rectifier 57 serves to convert the MAD energy into positive informational energy only so that unipolar networks may be utilized thereafter. The sequencing circuitry 54 permits a multiplexing sequence of forty-eight sample periods over a range of different gains such that the resultant signals may time share the rectifier 57, log compressor 58, and the other components of the preprocessor 41 and processor 42. The output from the log compressor 58 is fed into a comparing and abstracting network 59, explained in detail with respect to FIG. 5, which includes a multiplexed feature abstractor 60, the output of which is connected to thirty-six demultiplexing switches 61, which in turn are connected at their respective outputs to thirty-six long term sample and hold circuits 62, one sample and hold circuit for each of the demultiplexing switches. The comparing and abstracting network 59 operates upon the MAD signal energy to provide analog primary features thereof. These features are the positive and negative slopes of the energy in each of the adjacent channels for each of the four ranges.

Empirical analysis and testing has shown that if the positive and negative slopes of adjacent channels of the MAD signal energy can be abstracted to obtain primary features, these primary features may be utilized to ascertain the relative presence of invariant submarine features, whereas the features exhibited by the associated noise are entirely random and, therefore, relatively unpredictable and variant. Accordingly, through abstraction of primary feature slope information and the utilization of a probability of occurrence techniques per slant range, the present invention ascertains the presence or absence of a submarine unencumbered by the presence of signal-like noise.

The output from the sample and hold circuits 62 is fed to the processor 42 portion of the system. The processor includes a junction box 350 (which serves as a tying and routing point) and plurality of recognition and decision logic networks 63, separate decision logic being used for each of the four amplitude ranges. Each amplitude range is equatable to a range of separations between the search aircraft containing the present invention and the submarine to be detected. More particularly, range 1 corresponds to a slant range of 0 to 600 feet; range 2 corresponds to a 600 to 1000 foot slant range; range 3 corresponds to a 1000 to 1600 foot slant range; and range 4 corresponds to slant ranges greater than 1600 feet.

The decision logic contains both analog and digital circuitry which operate upon the analog primary slope features presented thereto and, if certain probability criteria per amplitude range are met, recognize and detect therefrom invariant submarine features indicative of submarine presence. Upon recognition, the decision logic provides a signal to a display 64. Also connected to the display 64 is an overload logic network 65 which receives overload signal information either from the output of the driver amplifier 51 (overload A) or from the output of full-wave rectifier 57 (overload B). An overload A signal indicates that range 1 has been overloaded. An overload B signal indicates that either range 2 or 3 or 4 has been overloaded. This will be discussed more fully hereinafter with respect to FIG. 8. The decision logic 63 also receives signal information along lines 66 and 67 (respectively on either side of the log compressor 58). Hence the analog features operated upon by the decision logic 63 involve not only the previously mentioned primary feature positive and negative channel energy slopes but also some channel energy directly, and some log compressed channel energy. Both the channel energy and log compressed channel energy are taken from range 1 as will be discussed hereinafter. The channel energy is linear and is taken along the line 66 through the switch 66a. The logarithmarized channel energy is taken along the line 67 through the switch 67a.

As noted heretofore, the information from the eleven bandpass filters 52 is time multiplexed, the multiplexing system consisting of forty-eight sample periods before the sequence is repeated. The comb filters 52 are sequentially sampled from lowest to highest center frequency with each analog sample first passed through an amplifier of unity gain. This is range 1. After this initial sampling, the filter outputs are again sampled with the analog sample voltages multiplied by a gain factor of 10. This is range 2. Ranges 3 and 4 occur when the filter sampling is repeated a third and a fourth time with gains of 50 and 250, respectively. In this way the received MAD amplitude-time information is filtered and sequentially sampled to provide amplitude-time-frequency information.

The timing for the multiplexing and sequencing, the switching of the multiplexed feature abstractor 60 and the demultiplexing switches 61, the decision logic 63, and overload logic 65, is provided from a precision tuning fork oscillator 68 which feeds timing logic 69. The oscillator and timing logic 69 comprise a timing system 70 which will be discussed more fully hereinafter with respect to FIG. 9.

Multiplexing Sequencer

Referring now to FIG. 4 there is shown the multiplexing sequencer 54. The sequencer 54 is fed from the eleven buffer amplifiers 53a–53k, inclusive, each of which is connected to a separate bandpass or comb filter 52. Each of the buffer amplifiers 53 has four outputs, each of which provides an identical output signal. As shown, buffer amplifier 53a has the outputs labeled 1A, 1B, 1C, and 1D. Similarly, amplifier 53b has the outputs 2A, 2B, 2C, and 2D. The remaining buffer amplifiers, namely 53c–53k, inclusive, also each have four output terminals labeled A through D, inclusive, and 3 through 11, inclusive, in the manner analogous to the labeling of the terminals of amplifiers 53a and 53b.

Also shown in FIG. 4 are the four ranges: range 1, range 2, range 3, and range 4 corresponding respectively to the amplifier gains of 1, 10, 50, and 250 for four operational amplifiers 71, 72, 73, and 74 and associated range switches, $S_1$, $S_2$, $S_3$, and $S_4$. It should be noted that more than one operational amplifier may be utilized per range, thus, for example, the amplifier 73 may comprise an amplifier of gain 5 cascaded with an amplifier of gain 10 for linearity purposes. Connected to each of the four amplifiers (through the respective range switches $S_1$–$S_4$, inclusive) are the outputs of twelve multiplexing switches. More particularly, the output terminals of switches 75–86, inclusive, are connected together to a common bus 39 which is connected to the input of operational amplifier 71 through range switch $S_1$. Similarly, switches 87–98, inclusive, have their output terminals connected to common bus 99 which, in turn, is connected to the input of operational amplifier 72 through range switch $S_2$. In like manner switches 149–160, inclusive, have their output terminals connected to the common bus 161 which is connected to the input of amplifier 73 (through switch $S_3$) while switches 162–173, inclusive, are connected at their output terminals to the common bus 174 which is connected to amplifier 74 (through switch $S_4$). Each range thus comprises a range switch and twelve additional switches, one switch per range having a grounded input terminal for reasons to be explained during the discussion of the timing system 70. Each of the remaining eleven switches per range has a single input terminal labeled to correspond with a particular output terminal of buffer amplifiers 53a–53k, inclusive. Thus, output terminal 1A of amplifier 53a is connected to input terminal 1A of switch 75. In like manner the remaining connections from buffer amplifier output terminal to like switch input terminal are effectuated. All of the switches shown may be either of the integrated or solid state type and close (a "high" condition) upon the receipt of a control signal and, in the absence thereof, automatically return to the open or low condition. Each of these switches as well as the range switches $S_1$–$S_4$, inclusive, receive a control signal from the timing logic 69. This will be discussed hereinafter with respect to FIG. 9. It is noted here, however, that the range 1 switches receive control signals at terminals 101–112, inclusive; range 2 signals receive control signals at terminals 113–124, inclusive; range 3 switches receive control signals at terminals 125–136, inclusive; and range 4 switches receive control signals at terminals 137–148, inclusive.

As noted heretofore the forty-eight switches provide forty-eight sample periods, the switches closing sequentially in response to control signals received at terminals 101 through 148, inclusive. Thus, the input MAD signal energy from each of the eleven buffer amplifiers first is fed through switches 75–86, inclusive, in range 1 via lines 1a–11a, inclusive, and out through a unity gain amplifier 71 to the summing amplifier 56. Sequentially, thereafter, range 2 switches are closed to provide this same information from the buffer amplifiers 53 through a gain 10 amplifier 72 to summing amplifier 56. In like manner this same information is sequentially sampled by ranges 3 and 4 and amplified by amplifiers 73 and 74 respectively by a factor of 50 and 250 and fed to summing amplifier 56. After the first eleven of the twelve switches in a given range have closed and then opened, there is a dead time determined by the grounding of the twelfth switch, thereby indicating that the MAD energy is being switched from one range to another. All samples thus multiplexed are fed sequentially to the input of full-wave rectifier 57 (FIG. 2).

The sequenced signals appearing at the input of rectifier 57 are full-wave rectified thereby and fed to the multiplex feature abstractor 60 through the log compressor 58. The rectified signals are also fed via the overload "B" line to overload logic 65. Should an overload signal be present, the logic 65 will detect it and cause it to be displayed as an overload signal on the display 64. This will be discussed more fully hereinafter with respect to FIG. 8. Also, the overload "A" line will be explained. Additionally, the range information, besides being fed as above indicated, is parallelly fed via the line 66 (through switch 66a) and via the line 67 (through log compressor 58 and switch 67a) to the detection logic 63 of the processor 42. This will be more fully explained hereinafter.

Comparing and Abstracting Network

Figure 5:
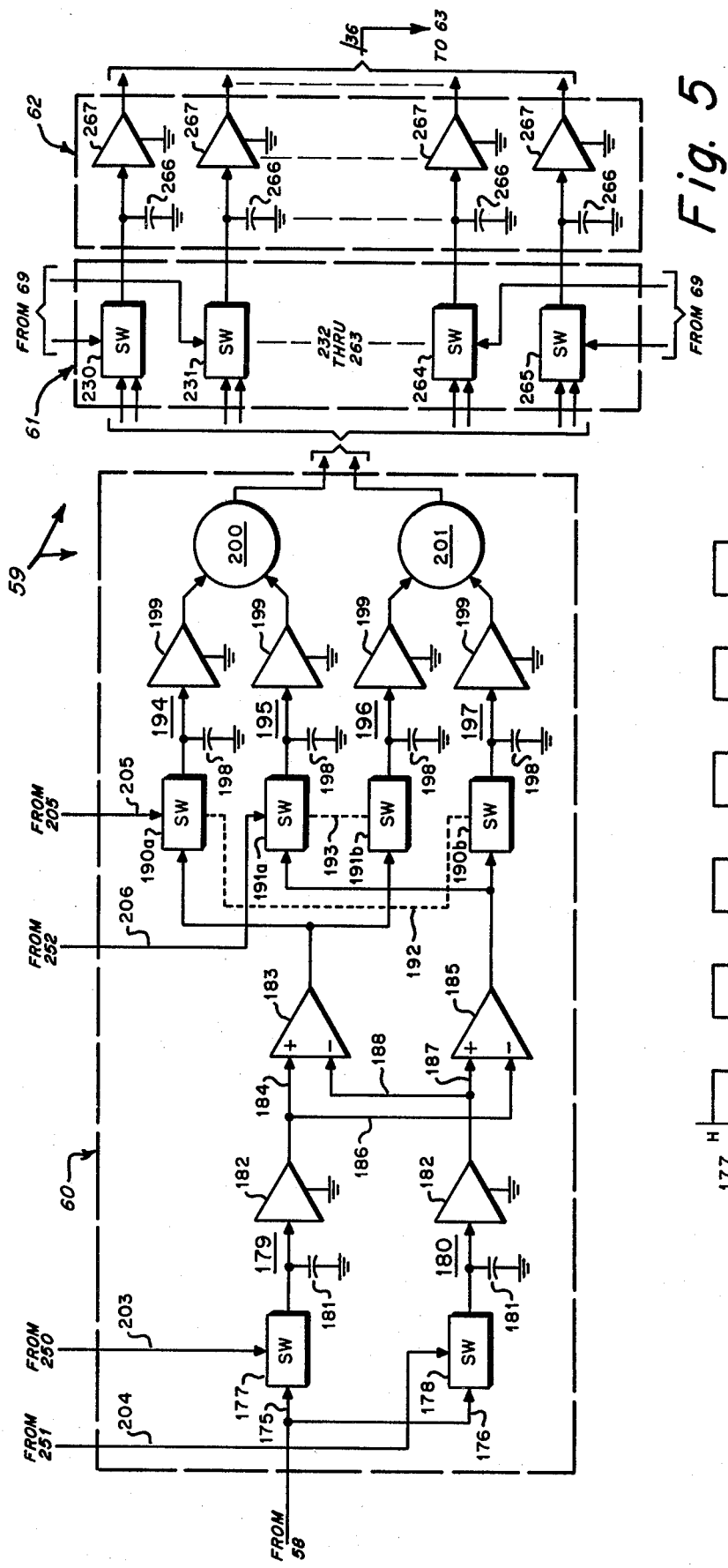
FIG. 5 is a schematic representation of the multiplexed feature abstractor, the demultiplexing switches, and the long-term sample and hold circuits of FIG. 2.

Referring now to FIG. 5, the comparing and abstracting network 59 will be described. This network includes multiplexed feature abstractor 60, demultiplexing switches 61 and long term sample and hold circuits 62, which may include low-pass filters (not shown). The input to the feature abstractor 60 is taken from the log compressor 58 and hence comprises the dynamically range compressed forty-four sequenced quanta of MAD signal energy. This energy is fed via lines 175 and 176 to, respectively, switch 177 or switch 178, (switch 177 being open when switch 178 is closed and vice versa as will be discussed hereinafter). The output of each of these switches is respectively connected to separate sample and hold circuits 179 and 180, each of which comprises a grounded polycarbonate capacitor 181 connected at its ungrounded end to a high input impedance operational amplifier 182. Sample and hold circuit 179 is connected to the plus input terminal of a differential amplifier 183 via the line 184 and is further connected to the negative input terminal of a differential amplifier 185 via the line 186. In like manner, sample and hold circuit 180 is connected to the positive terminal of amplifier 185 via line 187 and to the negative terminal of amplifier 183 via line 188. Both amplifier 183 and amplifier 185 are clamped to ground so that they will respond to positive differences only. The reason for this will become clear hereinafter. The output of each of the differential amplifiers 183 and 185 is respectively connected to the inputs of two switches. Amplifier 183 is connected to switches 190a and 191b. Each of these switches are ganged by suitable means (here shown as mechanical linkage 192 and 193) to a respectively identical switch 190b and 191a. It is to these switches that the output terminal of differential amplifier 185 is connected. The output terminals of each of the switches is connected to a second set of sample and hold circuits comprising again a grounded polycarbonate capacitor and a high input operational amplifier connected as disclosed hereinbefore with respect to circuits 179 and 180. These circuits 194, 195, 196, and 197 include, respectively, capacitors 198 and amplifiers 199. The outputs of sample and hold circuits 194 and 195 are connected to a negative slope abstractor 200, discussed in detail with respect to FIG. 7. In like manner, the outputs of sample and hold circuits 196 and 197 are connected to a positive slope abstractor 201, also discussed with respect to FIG. 7. The outputs both of negative abstractor 200 and positive abstractor 201 are connected to the demultiplexing switches 61.

It should be noted that all of the switches of the abstractor 60 may be either solid state or integrated circuit types or the like. Further, the capacitors 181 and 198 should be of the high precision polycarbonate type. Switches 177, 178, and switch pairs 190a and 190b and 191a and 191b receive timing control signals respectively via lines 203, 204, 205 and 206 from the timing logic 69. This will be more fully disclosed hereinafter.

Figure 6:
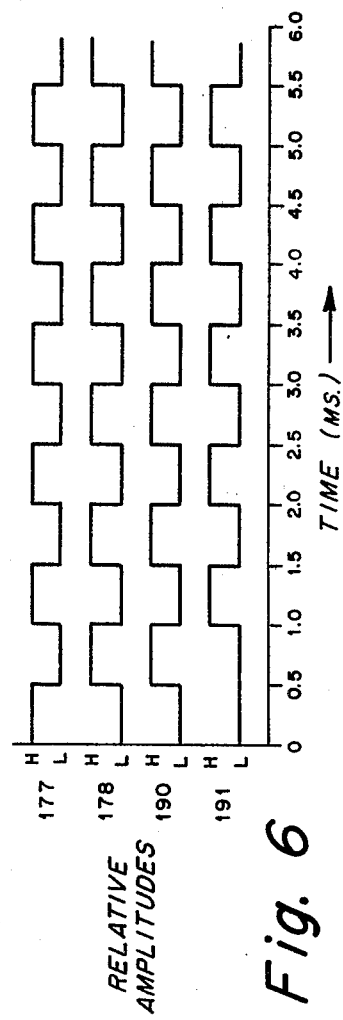
FIG. 6 is a timing diagram for the multiplexed feature abstractor of FIG. 5.

Referring now to FIG. 6 along with FIG. 5, the operation of the multiplexed feature abstractor 60 will be described. FIG. 6 is a timing diagram for the switches 177, 178, the switch pair 190a and 190b shown as 190 and the switch pair 191a and 191b shown as 191. The letters H and L refer respectively to the high or closed condition of the switch and the low or open condition of the switch. The timing pulses are of 500 microseconds duration and are derived from the timing logic 69. The timing of the system is such (as will be discussed hereinafter) that when the first, multiplexed quanta of MAD signal energy from channel 1, range 1, arrives at the input of feature abstractor 60, the switch 177 is closed and all other switches remain open. This can be seen from FIG. 6. Accordingly, this quanta of energy is passed through switch 177 and is held on the capacitor 181 of sample and hold circuit 179.

As noted heretofore, differential amplifier 183 responds to positive differences only and it would thus appear that a positive signal at the plus input thereof (i.e., the channel 1, range 1 energy quanta) and no signal at the negative input thereof would allow the amplifier to pass the channel 1, range 1 information through to either switch 190a or 191b. However, as both of these switches are open (the low condition) no signal is passed by differential amplifier 183. After 500 microseconds, switch 177 is open and switch 178 is closed, whereupon channel 2, range 1 information is passed through switch 178 and held by circuit 180. From FIG. 6, it can be seen that in addition to the closing of switch 178, the switch pair 190a and 190b is closed. The closing of switch 178 provides a signal path so that the differential amplifiers 183 and 185 may take positive differences. Thus, the channel 1, range 1 information is applied to the positive terminal of amplifier 183 and the negative terminal of amplifier 185. Concurrently therewith, the channel 2, range 1 information is applied to the negative terminal of amplifier 183 and the positive terminal of amplifier 185. If the channel 1, range 1 information is more positive than the channel 2, range 1 information, the differential amplifier 183 will provide an output indicative of the difference therebetween. Should the converse be true, however, amplifier 185 will take the difference. For purposes of illustration, assume that channel 1, range 1 information is more positive than channel 2, range 1 information. Then amplifier 183 takes the difference therebetween and this information is passed by switch 190a (switch 191b is open) and deposited upon the polycarbonate capacitor 198 of sample and hold circuit 194.

After one millisecond the switch 177 is closed and the third quantum of energy (channel 3, range 1) is fed through the switch 177 and held by circuit 179 at the positive terminal of amplifier 183 and the negative terminal of amplifier 185. These amplifiers now extract the positive difference between channel 3, range 1 information and channel 2, range 1 information, whichever is more positive. For purposes of illustration assume that the energy in channel 2 is more positive than the energy in channel 3. Accordingly, differential amplifier 185 provides a difference signal representative of the positive difference between the two signals to the input terminals of switches 191a and 190b. As can be seen from FIG. 6, however, switch 191 is closed while switch 190 is open. Accordingly, a signal flows through switch 191a and is held by circuit 195. Thus there is now present at the input of negative slope abstractor 200 the positive difference between channels 1 and 2 (as held by circuit 194) and the positive difference between the channels 2 and 3 (as held by circuit 195). The negative slope abstractor 200 determines which of these two differences is the minimum. That is, the negative slope abstractor 200 provides the minimum slope of the negatively feature abstracted signals between adjacent channels. In like manner the positive slope abstractor 201 provides the minimum slope between adjacent channels in the positive sense.

The above assumptions were made to insure a coincidence of inputs at the negative slope abstractor 200. In practice, should a different result have arisen abstractor 200 could not take a difference and would await the occurrence of two inputs thereto. Each of these inputs must be from adjacent channels since the holding circuits store each quantum of information for but one sample period.

Referring now to FIG. 7 negative and positive slope abstractors 200 and 201, respectively, will be explained in detail. Both slope abstractors are unipolar devices known as neuron gates and are somewhat similar to differential amplifiers clamped to ground with an input threshold to be overcome. The output signal from these devices is generally directly proportional to the input signal after overcoming the threshold value and before saturation of the device occurs. As noted heretofore, these devices detect the minimum difference between the energy levels in adjacent channels and, accordingly, may be utilized to determine whether a positive or negative slope is present in each time slot and to indicate the analog value of the slope, this because the value of a slope at any time in a particular channel is defined as being equal to the smaller of two adjacent channel differences.

Each of the abstractors comprises two neurons. Each neuron, 204, 205, 208, and 209, has an excitatory input terminal 212 and an inhibitory input terminal 213. The output of neuron 204 is connected to the inhibitory input of the neuron 205 via line 214. Similarly, for the positive abstractor, line 216 connects the output terminal of neuron 208 with the inhibitory input of neuron 209. The excitatory input terminals of neurons 204 and 205 are connected together by line 218. In like manner, line 220 connects the excitatory inputs of neurons 208 and 209. The outputs of neurons 205 and 209 are each connected to the demultiplexing switches 61.

For convenience, the positive difference between the energy in channel 1, range 1 and the energy in channel 2, range 1 being held by circuit 194 has been given the letter designation "a" and the positive difference between the energy in channel 2, range 1 and channel 3, range 1 being held by circuit 195 has been given the designation "b". Accordingly, the value "a" is applied to the excitatory input of neuron 204, while the value "b" is applied to the inhibitory input of neuron 204. Operationally, these neurons take positive differences by providing an output equal to the excitatory input minus the inhibitory input only if the value on the excitatory input is greater than that on the inhibitory input. In other words and with respect to neuron 204, if "a" is greater than "b", "a"-"b" appears at the output line 214. Conversely if "b" is greater than "a", a zero output will appear on line 214. Since only one of the two cases is possible, it is apparent that either neuron 204 provides the signal "a"-"b", or zero. If the signal "a"-"b" is provided to the inhibitory input terminal of neuron 205 and since the excitatory input terminal thereof has applied thereto the value "a" the output of neuron 205 will be "a"-("a"-"b") or "b". Similarly if zero is provided to the inhibitory input of neuron 205 and "a" is provided to the excitatory input thereof, the output will be "a"-"0" or "a". Recalling that "a" is the positive difference between the energy levels in range 1, channels 1 and 2 and "b" is the positive difference between the energy levels in range 1, channels 2 and 3, it can be seen that an output of either "a" or "b" will respectively be the minimum difference. That is, an output of "a" indicates that in range 1, channel 1 energy minus channel 2 energy is the more minimum than channel 2 energy minus channel 3 energy, and conversely, an output of "b" indicates that channel 2 energy minus channel 3 energy is more minimum than channel 1 energy minus channel 2 energy. In this way, primary feature slope abstractions are effectuated.

Below in Table I is shown the other possible multiplexed feature abstractor combinations.

TABLE I

POSSIBLE MULTIPLEX FEATURE ABSTRACTOR COMBINATIONS

| Sample Periods | Timing of Switches Indicated | | | | Diff Amp Outputs Per Sample Period | | Neuron Inputs Per Sample Period | | | |
|---|---|---|---|---|---|---|---|---|---|---|
| | 177 | 178 | 190 | 191 | 183 | 185 | 194 | 195 | 196 | 197 |
| 1 | H | L | L | L | | | | | | |
| 2 | L | H | H | L | 1−2 | 2−1 | | | | 2−1 |
| 3 | H | L | L | H | 3−2 | 2−3 | 1−2 | 2−3 | 3−2 | 2−1 |
| 4 | L | H | H | L | 3−4 | 4−3 | 3−4 | 2−3 | 3−2 | 4−3 |
| 5 | H | L | L | H | 5−4 | 4−5 | 3−4 | 4−5 | 5−4 | 4−3 |
| 6 | L | H | H | L | 5−6 | 6−5 | 5−6 | 4−5 | 5−4 | 6−5 |
| 7 | H | L | L | H | 7−6 | 6−7 | 5−6 | 6−7 | 7−6 | 6−5 |
| 8 | L | H | H | L | 7−8 | 8−7 | 7−9 | 6−7 | 7−8 | 8−7 |
| 9 | H | L | L | H | 9−8 | 8−9 | 7−9 | 8−9 | 9−8 | 8−7 |
| 10 | L | H | H | L | 9−10 | 10−9 | 9−10 | 8−9 | 9−8 | 10−9 |
| 11 | H | L | L | H | 11−10 | 10−11 | 9−10 | 10−11 | 11−10 | 10−9 |
| 12 | L | H | L | L | | | | | | |

This Table shows in the first five columns thereof (each vertical alignment data represents a column) substantially the same information as that shown graphically in FIG. 6. Columns 6 and 7 show the possible differential amplifier output differences per sample period while columns 8-11, inclusive, show the possible input signals to the neuron gates per sample period. The numbers 1-11, inclusive, in columns 6-11, inclusive, represent the energy levels in the correspondingly numbered channel. Thus, for example, at the end of the second sample period or from FIG. 6 at the expiration of 1 millisecond, switches 177, 178, 190, 191 are positioned such that either differential amplifier 183 or 185 will provide an output signal of respectively 1 minus 2 or 2 minus 1 where, 1 represents the energy level in channel 1, range 1; and 2 represents the energy level in channel 2, range 1. If the output is 1 minus 2, then 1 minus 2 appears at the input of negative slope abstractor 200 from sample and hold circuit 194. Conversely, if 2 minus 1 is the output signal, then this appears at the output of sample and hold circuit 197 to positive slope abstractor 201. In like manner, at the end of the third sample period possible neuron inputs are as shown in the last four columns of Table I.

From FIG. 5 and Table I it can be thus seen that a 1 minus 2 at 194 and a 2 minus 3 at 195 satisfy the two input AND gate condition of negative abstractor 200 thereby allowing the neurons thereof to determine the minimum negative slope. Similarly, 3 minus 2, and 2 minus 1 at the inputs of positive abstractor 201 render it conductive for positive abstraction. Any other combination, as for example 1 minus 2 and 3 minus 2 is ineffective and no slope is abstracted if this sequence occurs. What this means then is that the definition for slope is not satisfied for the quanta of data being examined.

Upon examining Table I it can be seen that no slope abstractions are taken from either channel 1 or channel 11. That is, there is no channel prior to channel 1 or subsequent to channel 11 which may be utilized therewith to extract a minimum difference. This end effect of the abstractor results in only channels 2-10, inclusive, (nine channels in all) being available from which primary feature positive and negative slopes may be abstracted, all channels, however, being utilized in obtaining these slopes.

As only nine channels provide positive and negative analog slope feature recognitions, only thirty-six (nine channels times four ranges) demultiplexing switches are required. Each demultiplexing switch 230-265, inclusive, (FIG. 5) is connected at its input terminal to the feature abstractor. Additionally, each demultiplexing switch is connected at its output to long term sample and hold circuits 62 which comprise 36 polycarbonate capacitors 266 grounded at one terminal thereof and connected at their other terminals to both the output of respective demultiplexing switches 236-265, inclusive, and the input of high impedance operational amplifiers 267. Each of the switches 230-265, inclusive, is connected to timing logic 69 and is controlled thereby in the manner to be hereinafter described. It should be noted that switches 230-265, inclusive, may be solid state switching elements, integrated circuits, or other electronic switches.

Overload Logic

Referring now to FIG. 8 the overload logic for the system of FIG. 2 will be described. Overload logic 65 comprises a threshold voltage comparator 630 having four outputs each of which is connected to an input of two input terminal AND gates 631, 632, 633, and 634. The second inputs of the aforementioned AND gates are connected to the timing logic 69. The outputs of the AND gates are fed both to the decision logic 63 and the display 64. The purpose of the overload logic is to provide an indication to the display that the received MAD energy cannot be representative of a submarine anomaly for the range is overload even if every feature abstraction indicates that it is. That is because prior study and analysis of MAD signals have shown that submarine signals exhibit certain strengths per slant range in addition to and necessarily aside from their primary features. As a typical example, for slant ranges of greater than 600 feet a submarine signal can be no greater than about 0.3 gammas. Similarly, for slant ranges between 1,000 and 1,600 feet the signal should range between 1 gamma down to 0.3 gamma; from 600 to 1,000 feet, 10 gammas down to 1 gamma, and for less than 600 feet up to 50 gammas and down to 1 gamma. In the range 1 case, since all of the comb filters have the same saturation level and, further, since range 1 can be considered to use all filters, if any one filter saturates it is an indication that the signal received thereby is greater than 50 gammas and, therefore, is not a submarine signal. This saturation will cause an overload current to flow along the line labeled "overload A" to the threshold comparator 630 where, if a supplied reference voltage (not shown) is overcome an output signal issues along the line 635 to AND gate 631. If input signal A is detected in overload, the comparator 630 provides an output via line 629 during the period of saturation. Input signal B is a multiplexed signal.

The timing has been set such that during the operation of range 1 multiplexing, an enabling timing signal is applied to AND gate 631 via line 639. Should an input appear along line 635, AND gate 631 is therefore enabled and provides an output signal both to decision logic 63 (to reset it) and to display 64 to indicate the overload. In like manner, during range 2, 3, and 4 operation, timing logic 69 provides a timing signal to, respectively, AND gates 632, 633, and 634 via lines 640, 641, and 642. Should there occur an output signal from threshold voltage comparator 630 along lines 636, 637, or 638 during, respectively range 2, 3, or 4 operation, AND gates 632, 633, or 634 will be enabled and hence provide overload signals to decision logic 63 and display 64.

Tuning For Oscillator And Timing Logic

Referring now to FIG. 9 the timing system and associated logic will be described. Functionally, the timing logic 69 takes the system clock or tuning fork oscillator 68 output and derives the range timing intervals, channel timing intervals, and switch drive waveforms for the various components of the overall system. Also provided are various clock frequencies for use in the recognition logic of the processor.

A tuning fork oscillator 68 provides a square wave output of 3840 Hz to the timing logic 69. At the input of logic 69 is a divide by two flip-flop 250, the input of which is connected to the oscillator 68 output, and the output of which is connected via line 203 to the input of switch 177 (FIG. 5) and through an inverter 251 (via lines 204 and 205) and a one millisecond time delay 252 (via line 206) to, respectively, switches 178, 190, and 191 in the feature abstractor of FIG. 5. The output of flip-flop 250 is also connected to an n-type modulo counter 253, and additionally connected via line 254 to the input of a two-input AND gate 255. Modulo counter 253 is connected to a second modulo counter 256 and also to a second two-input AND gate 257 via the line 258. Modulo counter 256 is itself connected to the second input of gate 257 via line 259 and is further connected to a two-input AND gate 260 via line 261. Both AND gates 255 and 257 are connected to a flip-flop 262, AND gate 255 being connected to the set (s) input thereof, while AND gate 257 is connected to the clear (c) input thereof. Flip-flop 262 is connected to AND gate 260 from its "0" output via line 263. AND gate 260 is connected at its output to a modulo counter 264 which, in turn, is connected to the second input of two-input gate 255 via line 265.

Modulo counters 253, 256, and 264 are of the shift register type commonly known in the art as modulo n counters. Each counter comprises a plurality of cascaded flip-flops and a NAND gate in the feedback loop thereof to insure that only one "1" circulates in a counter at a time. Counter 253 is a modulo four counter in that it divides an incoming pulse by four. Accordingly, it contains four flip-flops. Similarly, counter 256 is a divide by three, and counter 264 is a divide by four. The outputs a', b', c', and d' from counter 253 are ANDED with outputs a, b, and c from modulo counter 256 by twelve two-input AND gates 270-281, inclusive, output a being ANDED respectively with each of the four outputs of modulo 253, then output b being so ANDED and so on until twelve outputs are achieved. These twelve outputs are labeled 1-12, inclusive. Each of these is ANDED with the four outputs A, B, C, and D of modulo counter 264. This ANDING is accomplished through the use of forty-eight two-input AND gates, 282-329, inclusive. The aforementioned twelve AND gates 270-281, inclusive, provide the channel timing levels (the eleven filter channels plus the one grounded channel). The forty-eight two-input AND gates 282-329, inclusive, provide the multiplexing levels for the system. AND gate 270 is further connected via line 485a to a four stage binary counter 485. The counter provides four timing signals to the recognition logic 63, to be discussed hereinafter. The channel timing levels are shown in tabular form below in Tables II and III.

TABLE II

MODULO 253 OUTPUTS "ANDED WITH MODULO 256 OUTPUTS TO OBTAIN CHANNEL TIMING LEVELS

| Modulo 253 | Modulo 256 | | | |
|---|---|---|---|---|
| a' | a | a'a = 1 | a'b = 5 | a'c = 9 |
| b' | b | b'a = 2 | b'b = 6 | b'c = 10 |
| c' | c | c'a = 3 | c'b = 7 | b'c = 11 |
| d' | d | d'a = 4 | d'b = 8 | b'd = 12 |

TABLE III

MODULO 260 OUTPUTS "ANDED" WITH CHANNEL TIMING LEVELS TO OBTAIN MULTIPLEXING LEVELS

| Channel Timing Levels | Modulo 260 | | | |
|---|---|---|---|---|
| 1 | A | 1A | 1B | 1C | 1D |
| 2 | B | 2A | 2B | 2C | 2D |
| 3 | C | 3A | 3B | 3C | 3D |
| 4 | D | 4A | 4B | 4C | 4D |
| 5 | | 5A | 5B | 5C | 5D |
| 6 | | 6A | 6B | 6C | 6D |
| 7 | | 7A | 7B | 7C | 7D |
| 8 | | 8A | 8B | 8C | 8D |
| 9 | | 9A | 9B | 9C | 9D |
| 10 | | 10A | 10B | 10C | 10D |
| 11 | | 11A | 11B | 11C | 11D |
| 12 | | 12A | 12B | 12C | 12D |

From Table III and FIG. 9 it shold be apparent that the output of AND gate 282 is connected to the terminal 1A, FIG. 4, the output of AND gate 283 is connected to the terminal of 2A of FIG. 4, and so on until all the multiplexing switches of FIG. 4 are connected to the timing logic 69.

In operation the tuning fork oscillator 68 provides a continuous train of pulses which are divided by two by flip-flop 250 and fed to modulo 253 thereby causing the counter to circulate. Since this is a divide by four counter the final stage thereof provides an output pulse train having one-fourth the number of pulses per second than the input pulse train. This pulse train is fed to modulo 256 causing this counter to circulate. In turn, the last stage of this counter (a divide by three counter) supplies to modulo counter 264 through AND gate 260 a pulse train having one-third the pulses per second of its pulse train or one-twelfth the pulses per second from flip-flop 250. The twelve channel timing levels are then derived by combining the modulo 253 and modulo 256 count levels through the two-input logic gates 270–281, inclusive. Multiplexing levels are obtained by further combining the now formed channel levels with the modulo 264 range levels, A, B, C, and D, through the forty-eight AND gates 282–329, inclusive.

Flip-flop 262 may be considered as a countersink flip-flop and serves to synchronize the three counters so that the multiplexing levels always occur in the same sequence regardless of the states of the three counters at equipment turn on. This is necessary as it is difficult when using a number of small modulo n counters to maintain them in perfect synchronism so that the counts always follow the same order and further so that there are no ambiguous counts. Synchronization is effectuated by permitting all three counters to circulate initially and to stop the final modulo counter 264, the slowest of the counters, at the time it has reached a predetermined initial state level as, for example, all zeros. Then, by permitting the first two counters to circulate until they have simultaneously reached a predetermined state level, as for example a "one" at the final stage of each thereof, and by utilizing these two levels in combination as an input to synchronizing flip-flop 262, synchronization can be assured.

In operation, when the predetermined level state of all zeros appears in modulo counter 264 an output therefrom via line 265 in combination with the continuously fed pulse train from flip-flop 250 along line 254 enables the AND gate 255 to set the flip-flop 262 thereby inhibiting it and providing a zero output therefrom along the line 263. This inhibits the AND gate 260 and prevents the pulses from modulo 256 to feed modulo 264. Modulo 264 thus remains in this predetermined state until the predetermined states of modulos 253 and 256 are reached whereupon, simultaneously, outputs from the respective counters along lines 258 and 259 enable the AND gate 257. Having been enabled, AND gate 257 provides a clear signal to flip-flop 262 which, responsive thereto, provides an enabling "1" along the line 263 to enable AND gate 260 and thereby permit succeeding counter 256 levels to pass to the modulo counter 264.

Since the pulses along lines 258 and 259 are never inhibited, the synchronizing flip-flop 262 will always start in a cleared state so that modulo counter 264 will count until the desired initial state level (all zeros) is reached at which time the synchronization action may proceed as noted hereinabove. If at any time noise pulses cause an extra count to appear in modulo counter 264 resynchronization will be automatic. This will occur within one time frame of modulo counter 264 since the synchronization is rechecked at the desired initial state level in each time frame. It is noted that the modulo counters make it possible to perform the necessary multiplexing and demultiplexing of the MAD energy signal levels with only two-input AND gates and with a resultant saving in logic circuitry and complexity. If a straight binary counter were used for the multiplexing gates would have to be four input gates requiring twice the number of integrated circuits. It is further noted that since only thirty-six demultiplexing switches are utilized while forty-eight timing levels are available, the additional twelve thereof are left unconnected. More particularly, gates 283–291, inclusive; gates 295–303, inclusive, gates 307–315, indlusive; and gates 319–327, inclusive, are connected, respectively, to switches 230–265, while gates 282, 292, 293, 294, 304, 305, 306, 316, 317, 318, 328, and 329 are left unconnected with respect to the demultiplexing switches.

Figure 10:
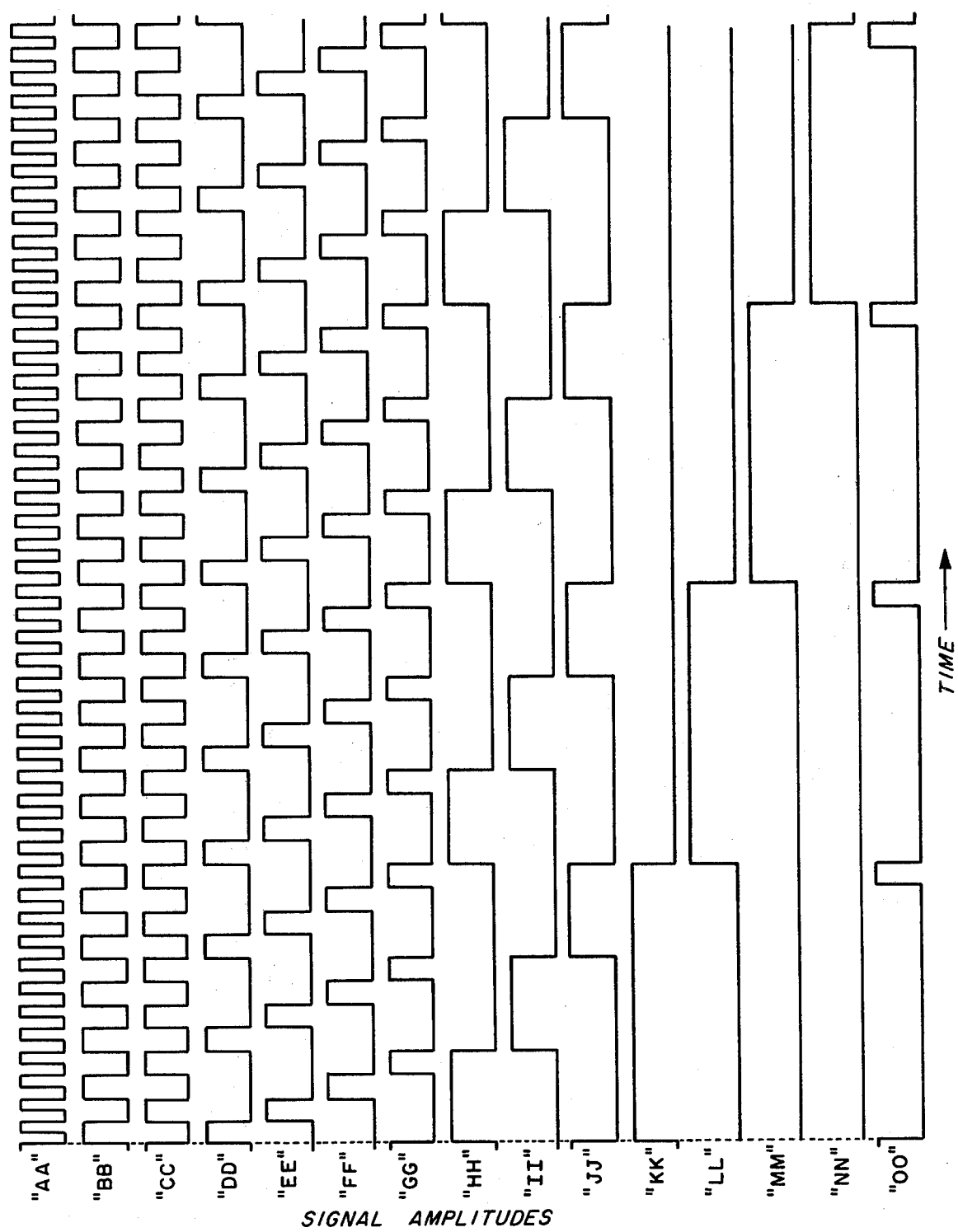
FIG. 10 is a timing diagram showing the various waveforms generated by the timing logic of FIG. 9.

Referring now to FIG. 10 the timing waveforms generated by the tuning fork oscillator 68 and timing logic 69 are shown. These waveforms are identified by letter symbols, these symbols being shown in FIG. 9 to indicate from whence they were derived. Thus, the waveform AA is the oscillator or clock frequency. This frequency is divided by two by flip-flop 250 to form the 500 microsecond pulse train BB which, in turn, is inverted by inverter 251 to form the pulse train CC. Pulse train BB is fed to modulo counter 253 wherefrom the waveforms DD, EE, FF, and GG are derived from the outputs of the first, second, third, and fourth flip-flops therein, respectively. Waveforms HH, II, and JJ are taken respectively from the flip-flops of modulo counter 256 along lines a, b, and c of FIG. 9 as shown. In like manner, the waveforms KK, LL, MM, and NN are taken at the outputs respectively of the four flip-flops in modulo counter 264. The multiplexing is achieved by the "ANDING" procedure discussed hereinbefore. More particularly, and for example, the "ANDING" of waveforms DD-GG, inclusive, with the waveform HH produces the multiplexing channel levels for respectively range 1, channels 1, 2, 3, and 4. Accordingly, the "ANDING" of waveforms DD-GG, inclusive, with HH-JJ, inclusive, produces the twelve channel levels. Thus, waveform OO is the channel 12 reference pulse and is derived by "ANDING" waveform GG with JJ. Further, the "ANDING" of the twelve channel timing levels with the waveforms KK-NN, inclusive, provides the range timing levels for the system. Range 1 timing signals from AND gates 282–292, inclusive, are fed to, respectively, switch networks 66a and 67a, each of which may provide eleven signal paths for demultiplexing the range 1 information prior to its insertion into the recognition logic. Other waveforms such as the particular pulse trains fed into the decision logic 63 will be discussed hereinafter when the decision logic itself is discussed.

The preprocessing portion of the system has now been disclosed. It has been seen that the MAD amplitude-time energy is received, filtered to provide amplitude-time-frequency energy, multiplexed, full-wave rectified, log compressed, feature abstracted, demultiplexed, sampled and held and otherwise prepared for injection into the decision or recognition logic 63. Logic 63 forms the heart of the processor 42 of the system now to be discussed.

Processor

The processor includes the recognition and decision logic for the system. This logic is a combination of digital and analog circuitry and operates upon the primary features (positive and negative slopes) from all four ranges and the filter channel energy and log energy values from range 1. Accordingly, the processor is divided into four ranges corresponding to the four slant ranges as determined by the range amplifiers of FIG. 2. Both range two (R2) and range three (R3) are divided into three degrees (low, medium, and high) of probability that the signal detected is a submarine. Range one (R1) and range four (R4) are each divided into two degrees of probability. In other words, for example, range two high (R2H) probability means that for slant ranges between 600 and 1000 feet the probability of detection of a submarine is highest. Similarly, for the range two medium (R2M) the probability of detection is higher than for a range two low (R2L).

The processor logic functions to optimize the ratio of submarine signal to false alarm signal by relying upon past operator comparisons and laboratory analysis and statistical evaluation of MAD data with known submarine signatures. Through this technique, it has been found that certain features of the MAD submarine signal remain relatively invariant and that certain coincidences of events occur. For a given slant range, the higher the ratio of invariant features to noise and false alarms, the higher the probability of detection. Thus, in the R2H there will be more submarine signature signals detected (i.e., invariant features) than random noise signals than in the other R2 cases.

There is no range four high recognition logic. This is because of the increased difficulty of recognition at extreme ranges in a high probability condition for signals above 1600 feet. Conversely, there is no range one low recognition logic. This is because the amount of noise present as compared to submarine features is excessive and would thus indicate a large number of false alarms.

Figure 11:
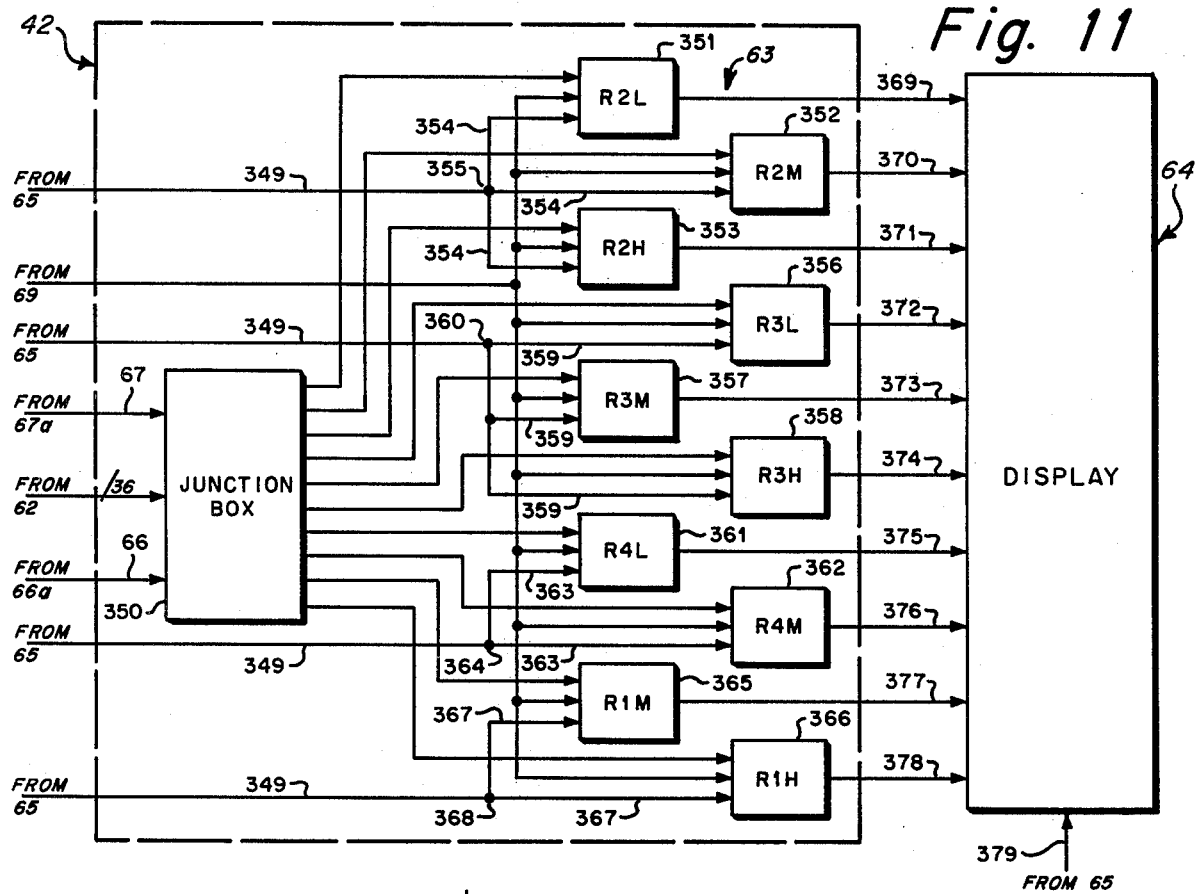
FIG. 11 is a block diagram of the particular recognition logic components within the processor of FIG. 2 showing the interconnections therewith with the preprocessor in accordance with the invention.

Referring now to FIG. 11, there is shown the recognition logic for the system. The processor 42 includes a junction box 350 which receives the demultiplexed primary feature abstracted MAD energy from the long-term sample and hold circuits 62 and the energy and log energy of range 1 information from, respectively, the full-wave rectifier 57 and the log compressor 58.

There are ten general outputs from the junction box 350, one each going to the ten recognition logic components. In actuality each of these ten wires may comprise a plurality of separate wires each of which carries particular primary feature (slope) information to each logic component. This will become clear hereinafter when one of the logic components is described in detail. It is noted, however, that junction box 350 serves as a tying and routing point wherefrom various combinations of the demultiplexed primary feature abstracted energy and the range 1 energy and log energy may be directly wired to the logic components.

Range 2 components 351, 352, and 353 are also connected together at the inputs by the line 354 which, at tie point 355, is fed via line 349 from the overload logic 65, FIG. 2. As noted heretofore, the overload signal resets the logic. This will be described hereinafter. The range 3 logic components, namely elements 356, 357, and 358, are likewise connected at their inputs via the line 359 and junction point 360 to the overload logic 65 (via line 349). Range 4 logic comprising components 361 and 362 is also connected via line 363 and junction point 364 to the overload logic 65 (via line 349). The range 1 logic components 365 and 366 are also connected to the overload logic 65 (via line 349) although these are connected to the overload A logic as opposed to the overload B logic for ranges 2-4, inclusive. These logic components 365 and 366 are connected to overload logic 65 via line 367 and junction point 368.

Each of the logic components is connected at the respective output terminals thereof via respectively the lines 369-378, inclusive, to the display 64 which may comprise a plurality of indicator lamps which light responsive to the receipt of a signal from one of the logic components thereby indicating the probability of the presence of a submarine. It should be noted that indicator lamps are also provided on the display 64 which are lit responsive to overload signals from overload logic 65 via the lines 379 thereby indicating an overload condition for the particular range.

The logic components comprise both analog and digital circuitry. The analog circuits include a level detector (LD) and a transition detector (TD). The level detector serves as an interface between the analog and digital circuitry in the recognition logic 63. It is utilized to sense when a signal reaches a given level and generate a digital "1" output responsive thereto so long as the sensed signal is above a preset threshold. The LD generates a "0" output when the signal falls below this threshold.

The transition detector detects a change or transition in the primary features (slopes) or other analog signals and is combination differentiator and threshold detector. Whenever a transition is detected the circuit yields a digital "1" output. When a transition is not present the circuit yields a digital "0" output.

The digital elements include a logic one-shot (LOS), an output one-shot (OOS), and a plurality of multi-input logic gates both of the AND and NAND variety. The LOS generates accurate time periods or windows which are used in the recognition logic 63 to measure the temporal features of the input signals supplied thereto. The LOS consists of a plurality of integrated circuits and generates its periods with the aid of a clock and digital counters. Like an AND gate, the device requires a coincidence of input signals before it is enabled. By slight modification, the LOS may be made retrigerable such that a recurrence of input signals restarts the device.

The output one-shot, OOS, indicates the decisions from the recognition logic. The device comprises an integrated circuit monostable multivibrator utilizing an external RC network to set the period thereof. Whenever the input to the OOS goes low, its period begins. Also included therewith is a transistor circuit utilized to increase the period stability at high duty cycles. All of the above-mentioned logic circuits will be discussed in detail hereinafter.

Range Three High Logic

The range three high (R3H) logic will now be discussed in detail. This logic includes all of the above-mentioned logic circuits. Thus an explanation of this logic will show the use of these novel logic circuits in the recognition logic. It should be noted, however, that the other logic components 351, 352, 353, 356, 357, 361, 362, 365, and 366 may or may not utilize all of these logic circuits and further may utilize more than one of them in actual operation. However, once it is seen how these various logic circuits operate, and it is understood how one of the logic components functions and there is presented the information utilized thereby and by the remaining logic components, all of the logic components may be readily fabricated.

Figure 12:
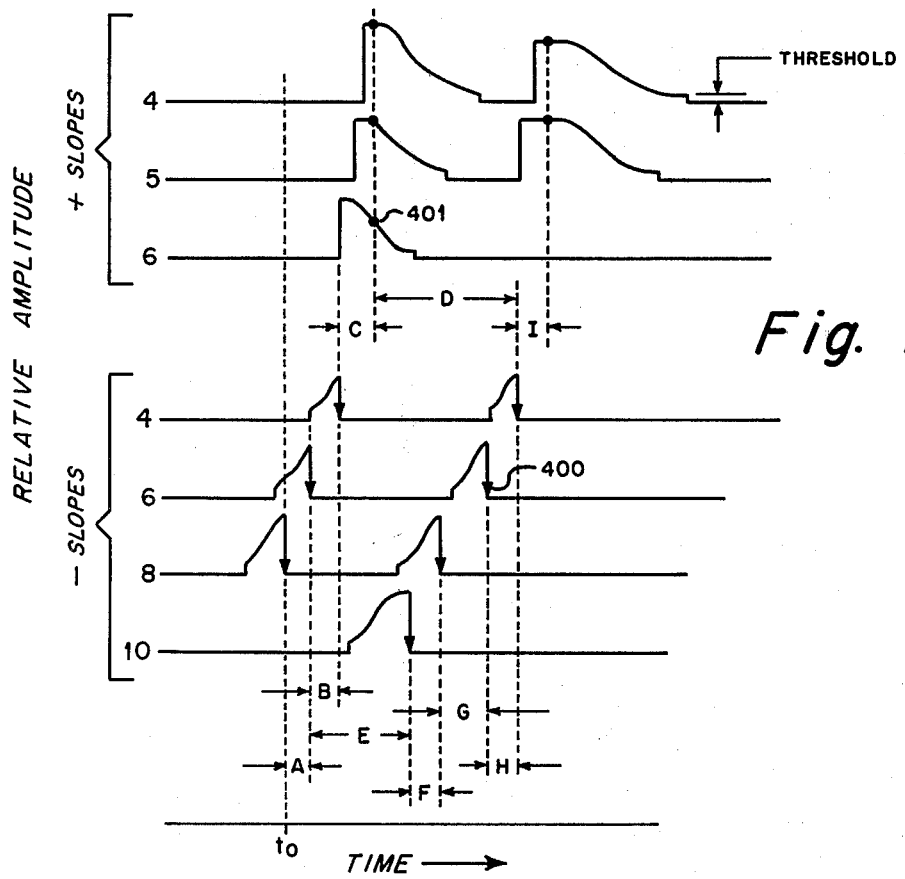
FIG. 12 is a graph of predetermined logic features for a particular range and probability of detection.

Three parallel recognition channels are used for detecting submarine signals at slant ranges between 1000 and 1600 feet (range 3). The highest probability (range three high) operates in the following manner. If a submarine signal is present, the recognition logic first detects, within prescribed time windows set by various LOS's, the sequence of even-numbered negative slopes turning off (i.e., transitions) from channel 8 through channel 4, inclusive. This sequence is followed by the coincidence of positive slopes in channel 4 through channel 6, inclusive, followed again by a sequence of even-numbered negative slopes turning off, this time from channel 10 through channel 4, inclusive. Subsequently, a coincidence of positive slopes in channels 4 and 5 is required. This can be seen by referring to FIG. 12 which is a graphical illustration of the above and FIG. 13 which illustrates the interconnections of elements for the logic circuits of R3H. In the graph of FIG. 12 transitions (turnoffs) occurring in the negative slopes for the even-numbered channels shown are represented by downwardly positioned arrows such as, for example, arrow 400. The presence of positive slope information above the threshold level of the level detectors is shown by a blackened dot for the positive slope channels of interest as, for example, the dot 401. The abscissa is time, taken from left to right as shown, with time equal to 0 (t=0) occurring when the first negative transition occurs.

Figure 13:
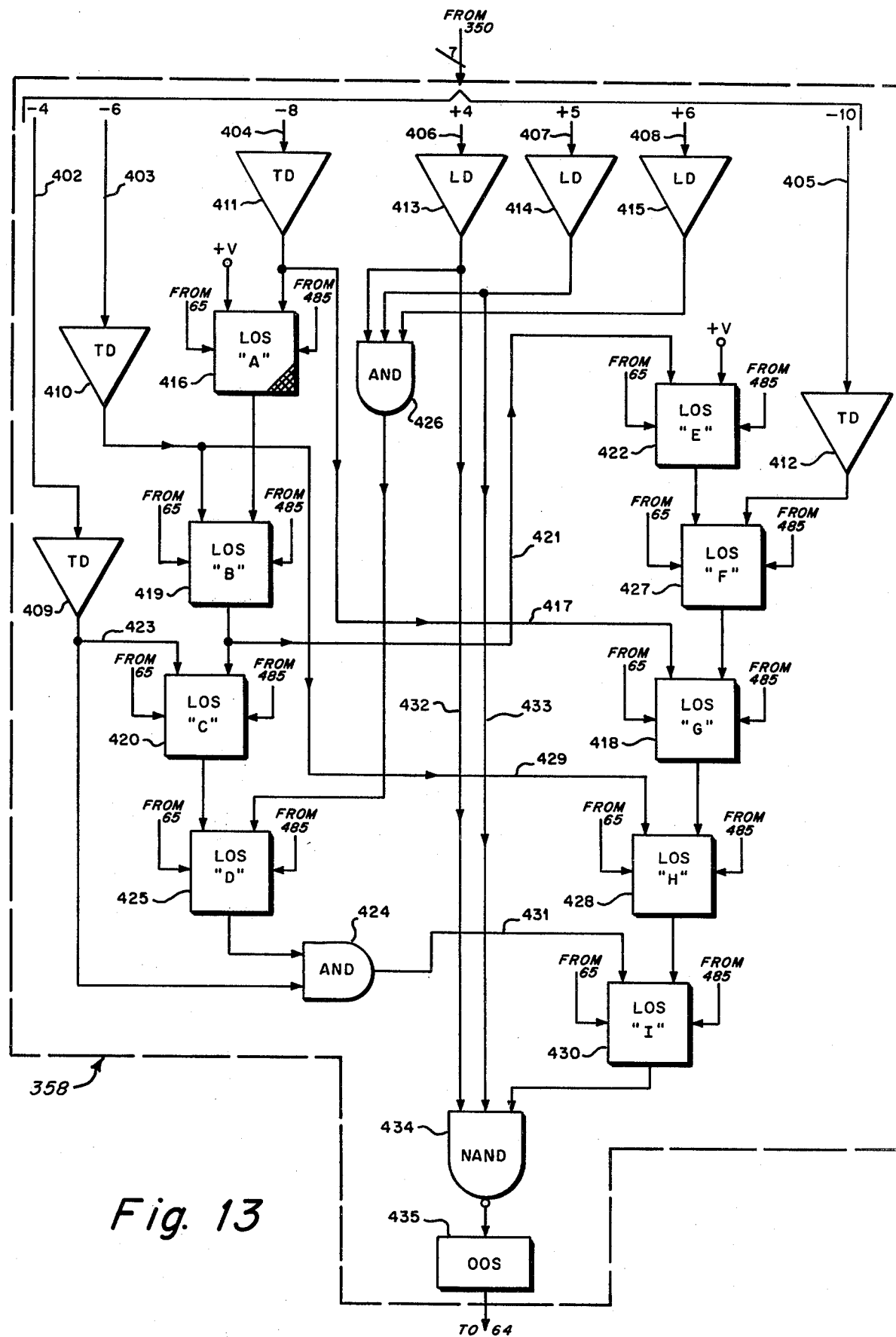
FIG. 13 is a block diagram of a logic circuit for recognizing and detecting the logic features of FIG. 12.

If the particular criteria shown graphically in FIG. 12 are satisfied, the logic of FIG. 13 provides a range three high indication that a submarine is present. Referring now to FIG. 13 along with FIG. 12 the R3H logic will be explained. There are seven inputs to the R3H logic, these inputs coming from junction box 350 and comprising wires from, respectively, the channels 4, 6, 8, and 10 which carry negative slope information and channels 4, 5, and 6 which carry positive slope information. These wires are numbered 402, 403, 404, 405, 406, 407, and 408. The wires from the negative slope channels (402-405, inclusive) are connected respectively to the inputs of transition detectors (TD) 409-412, inclusive, so that transitions or turnoffs may be detected. Similarly, the wires 406-408, inclusive, from the positive channels are connected respectively to level detectors 413, 414, and 415 so that the amplitude or level information may be detected. The output of transition detector 411 is connected to the input of retriggerable logic one-shot 416 and, via line 417, to the input of logic one-shot 418. LOS 416 is shown with a darkened corner to indicate that it is retriggerable. All the LOS's require a coincidence of two inputs to be enabled. Accordingly, the second input of LOS 416 is tied high (as to a source of positive d.c.), as is the standard logic practice. After being enabled, LOS 416, as well as all the other LOS's, provide an output for a predetermined time period or window. Table IV below shows the time periods for each of the various LOS's of the range three high logic.

TABLE IV

| TIME WINDOWS (IN SECONDS) for LOS's OF R3H | |
|---|---|
| LOS | Time Window |
| A | 0.25–1.6 |
| B | 0.2–1.6 |
| C | 1.05–1.64 |
| D | 3.55–7.4 |
| E | 1.5–4.0 |
| F | 0.96–2.6 |
| G | 0.72–2.0 |
| H | 0.62–2.3 |
| I | 2.1–2.55 |

The alphabetical designations A-I, inclusive, shown in FIGS. 12, 13, and Table IV are an additional key to identifying the respective LOS's. Thus, for example, LOS 416 provides the time window A, this time window beginning 0.25 seconds after LOS 416 receives its two input signals and lasting for 1.6 seconds.

The output of LOS 416 is connected to an input of LOS 419 which, at its other input, receives information from transition detector 410. The output of LOS 419 is connected to LOS 420 and, via line 421, to LOS 422. The other input of LOS 422 is tied high analogous to LOS 416. The second input of LOS 420 is connected to the output of TD 409 via line 423. TD 409 also feeds AND gate 424 which receives a second input from LOS 425. LOS 425 receives its two inputs from LOS 420 and from an AND gate 426 which receives the outputs from level detectors 413, 414, and 415.

Figure 14:
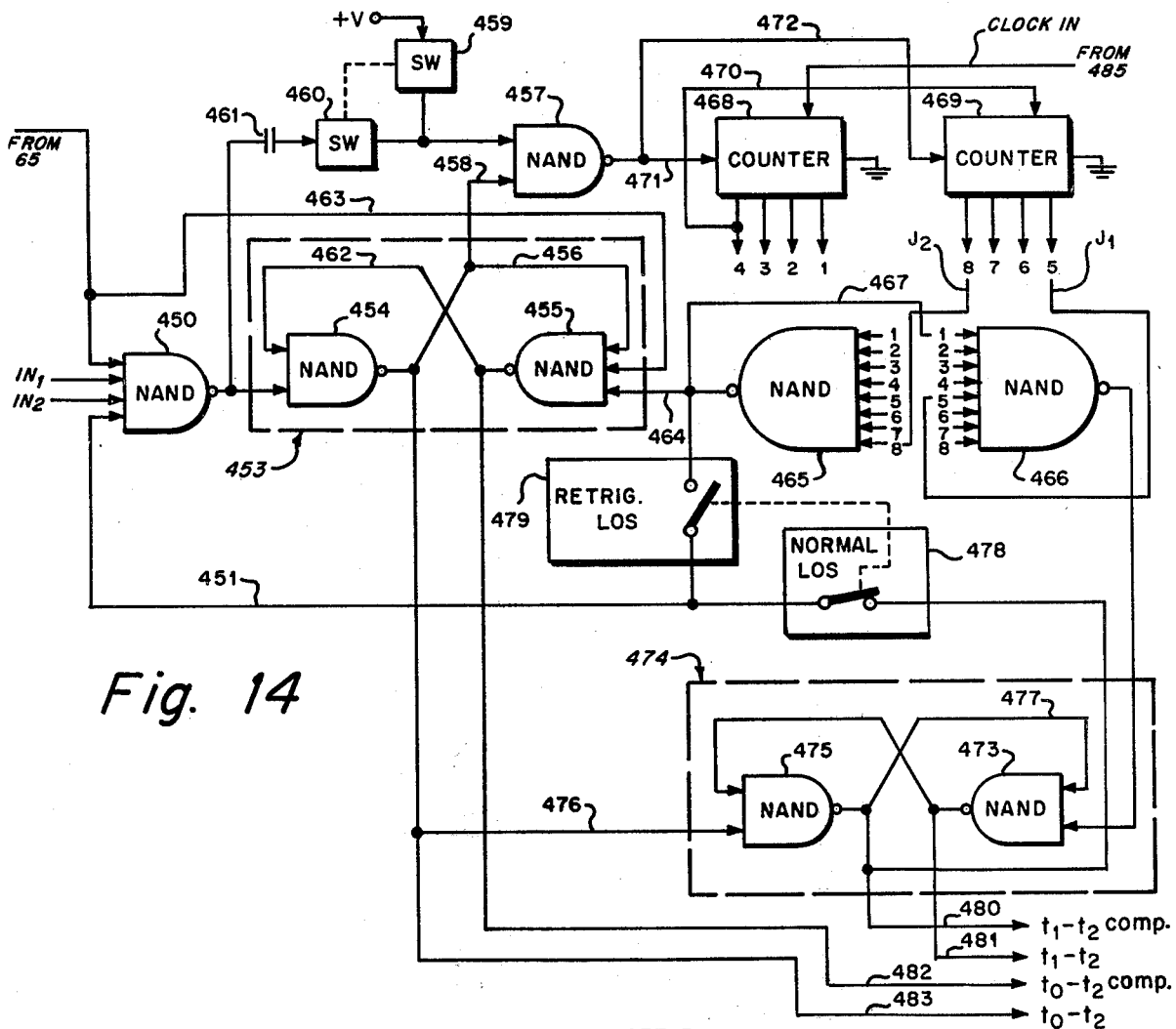
FIG. 14 is a schematic diagram of a logic one-shot used in the recognition logic of FIG. 11.

The outputs of transition detector 412 and LOS 422 feed LOS 427 which provides an input signal to LOS 418 along with the input signal from TD 411. The output of LOS 418 feeds LOS 428 as does an output from transition detector 410 via line 429. The inputs of LOS 430 are derived both from LOS 428 and, via line 431, AND gate 424. The output of LOS 430 is fed in combination with the outputs from level detectors 413 and 414 (via, respectively, lines 432 and 433) to a NAND gate 434, the output of which drives an output one-shot (OOS) 435. It is noted that should an overload signal from overload logic 65 be present all of the LOS's are reset thereby. This will be discussed more fully hereinafter when the LOS of FIG. 14 is explained.

The operation of the R3H logic will be be described. If a transition or turnoff in the negative slope of channel 8 occurs it is detected by TD 411 which provides an output to LOS 416 and LOS 418. Since LOS 416 is tied high at its second input it will provide an output signal while LOS 418 not having a coincidence of inputs, will remain quiescent. LOS 416 provides a signal for the time period A to LOS 419 and if during that time period a transition occurs in a negative slope of channel 6, transition detector 410 provides a signal indicative thereof to LOS 419. LOS 419 then provides an output signal for the time period B to LOS 420 which is rendered operative if during the time period B transition detector 409 provides an output via line 423 (thereby indicating the presence of a negative transition in the slope of channel 4). If this occurs LOS 420 provides an output for the time period C to LOS 425. This last-mentioned LOS is rendered operative upon additionally receiving during the time period C an output from AND gate 426. This output occurs upon the coincidence of the presence of signals in the positive slopes of channels 4, 5, and 6 detected by level detectors 413–415, inclusive.

If the aforementioned conditions are present LOS 425 is rendered operative for the time period D and feeds AND gate 424. If, during the D time window, a second negative transition in the slope of channel 4 is detected by TD 409 and gate 424 is enabled and provides an input, via line 431, to LOS 430.

From both FIG. 12 and Table IV, it can be seen that time period D is substantially longer than the others and it is during this time that transitions in the negative slopes of channels 10, 8, and 6 are looked for (although time windows therefore may in some cases begin at times earlier than the time window D).

As noted earlier, LOS 419 provides an output for the time window B to LOS 422 which, since it is tied high provides an output during the time window E to LOS 427. If during the period E a negative transition is detected by TD 412 in the negative slope of channel 10, the enablement of LOS 427 occurs. This LOS provides a time window for the period F and thus serves to enable LOS 418 if a second transition in the negative slope of channel 8 is detected by TD 411 during that period. LOS 418 provides an output during the time window G to LOS 428 which, in turn, provides a time window H if, during the time window G, TD 410 detects a negative transition in the slope of channel 6. If the time window H occurs within the time window D (see FIG. 12), the presence of outputs from LOS 428 and AND gate 424 enables LOS 430 which provides an output time window for the period I to NAND gate 434. If during the time window I there is a coincidence of positive slopes in channels 4 and 5, level detectors 413 and 414 function to provide input signals to NAND gate 434. When all of the inputs to NAND gate 434 go high it is enabled and the output thereof goes low to trigger output one-shot (OOS) 435. OOS 435 provides an output signal for a time period in seconds related to the range in a manner to be hereinafter described.

Thus, if all of the conditions of FIG. 12 are met the R3H logic will indicate the relative presence of submarine for the particular slant range and degree of probability being investigated. If, however, any of the above criteria is missing no output will issue from the R3H logic. Additionally, no output will issue if an overload signal is received. This will be discussed hereinafter.

Logic One-Shot (LOS)

Having discussed the R3H logic, the various elements thereof will now be explained. The first to be explained is the LOS or logic one shot of FIG. 14.

The input element for the LOS is a four-input NAND gate 450. This gate receives the two inputs labeled $IN_1$ and $IN_2$ from either level detectors, transition detectors, or other logic one-shots. It is the coincidence of signals at these two inputs that enables the LOS. In addition, gate 450 receives a feedback input signal via line 451 and an input signal which is normally tied high through a switch 452. However, should an overload signal from overload logic 65 occur, the fourth input to the gate 450 goes low to disable the NAND gate and hence the LOS. NAND gate 450 is connected to a flip-flop 453 which includes NAND gates 454 and 455. The output of NAND gate 454 is connected via line 456 to an input of gate 455. Additionally, gate 454 is connected to an input of NAND gate 457 by the line 458. The second input of gate 457 is normally tied high through normally closed switch 459. However, during the retriggerable condition (to be discussed hereinafter) switch 459 is opened and normally open switch 460 is closed to connect the output of gate 450 through a capacitor 461 to the second input to the gate 457. These switches may be connected together (here shown by mechanical linkage) so that one is opened while the other thereof is closed.

A second input to gate 454 of flip-flop 453 is taken from the output of gate 455 via line 462. Also, gate 455 receives the overload signal from logic 65. Gate 455 also receives a reset signal via line 464 from an eight-input NAND gate 465. A second eight-input NAND gate 466 is also provided and may be inhibited by NAND gate 465 via line 467. Each of the NAND gates 465 and 466 at the various input terminals thereof may be connected or jumped to appropriate output terminals of series connected counters 468 and 469. Counter 468 receives a clock frequency input signal from the four stage binary counter 485, FIG. 9 and provides four outputs each of which is representative of a successive division of the input clock by a factor of two. Additionally, the fourth output is connected via line 470 to drive the counter 469. This counter's four outputs each successively divide this input signal by a factor of two. Counters 468 and 469 receive enabling signals via respectively the lines 471 and 472 from the output of NAND gate 457.

The output from NAND gate 466 feeds a NAND gate 473 of a second flip-flop 474. The output of gate 473 is connected to an input of a like gate 475 which receives a second input via the line 476 from the NAND gate 454 of flip-flop 453. Similarly, the output of NAND gate 475 serves as an input, via the line 477, to the NAND gate 473. A switch 478 is normally closed so that the output from gate 475 may be connected via the line 451 to feed back into the input of the LOS (more particularly to the input of gate 450). During the retriggerable operation, however, switch 478 is open and switch 479 is closed (switch 479 is open during normal operation) so that the output signal from gate 465 may flow through the line 451 to feed back into the gate 450.

There are four output signals generatable by the LOS. These output signals occur within time periods denominated as $t_1$-$t_2$ complement; $t_1$-$t_2$; $t_0$-$t_2$ complement; and $t_0$-$t_2$, where $t_0$ is the start of a period; $t_1$ is the end of the first period; and $t_2$ is the end of a second time period. Thus the $t_0$-$t_2$ period and its complement start at $t_0$ and end at the time $t_2$ and, the $t_1$-$t_2$ periods and its complement, which are delayed periods and which are the time windows of Table IV, start at $t_1$ and end at $t_2$. The output signals are taken respectively from: the output of gate 475 via line 480, the output of gate 473 via line 481, the output of gate 455 via line 482, and the output of gate 454 via line 483.

Figure 15:
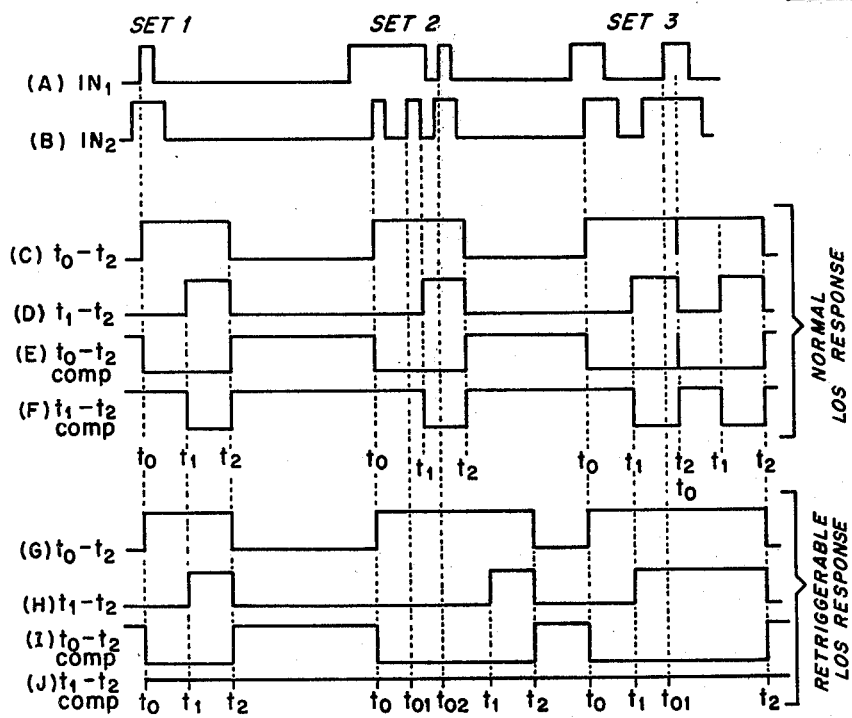
FIG. 15 is a timing diagram for the logic one-shot of FIG. 14.

The operation of the LOS will now be described with reference both to FIG. 14 and FIG. 15. FIG. 15 graphically illustrates in curves a and b three sets of typically representative input signals. Below these input signal sets are shown the four output periods of the normally operating LOS curves (curves c-f, inclusive). Below these are shown the retriggerable LOS output curves g-i, inclusive. As shown there is no $t_1$-$t_2$ complement for the retriggerable LOS.

The input pulses of curves a and b may be derived from level detectors, transition detectors, and/or other LOS's. For the first set of input pulses, the start of the LOS ($t_0$) occurs as soon as both inputs are present (i.e., upon the coincidence of the two inputs). Output $t_0$-$t_2$ (curve c and its complement, curve e) begin at $t_0$ and extend to time $t_2$ (this latter time being determined by eight-input NAND gate 465 to be discussed hereinafter. Output $t_1$-$t_2$ (curve d and its complement curve f) start at time $t_1$, derive from eight-input NAND gate 466 to be discussed hereinafter, and also end at time $t_2$. The second set of inputs of curves a and b serve to illustrate that once the normal LOS starts timing its periods variations in the input have no effect on its operation. From set 3 of curves a and b it is seen that if both input signals are present at time $t_2$ the outputs either remain high after the first time $t_0$ or are pulsed high or restarted as shown.

The retriggerable LOS is a slight modification of the normal LOS where the recurrence of both input signals restarts the logic circuit. This modification consists of the inclusion of the capacitor 461 (by the closing of switch 460 and the opening of switch 459) and the closing of switch 479 and opening of switch 478, as noted heretofore. There are three outputs present: $t_0$-$t_2$; $t_1$-$t_2$, and $t_0$-$t_2$ complement.

For the first set of input signals (curves a and b) the retriggerable LOS output is the same as for the normally connected LOS. With regard to set 2 (i.e., changes in the inputs after the LOS has started) the retriggerable LOS outputs are different from those of the normal LOS. More particularly, for the set 2 example the start of the first pulse curve b initiates time $t_0$ and when the pulse of curve b goes low it has no effect on the timing of the LOS. However, when this pulse again goes high, with the first input of curve a remaining high, the LOS is retriggerable at $t_{01}$. When the pulse of curve b goes high the third time nothing happens because the pulse of curve a has gone low. However, when the pulse of curve a again goes high (with the pulse of curve b remaining high) the LOS is again restarted at $t_{02}$. Thereafter the output periods are timed normally.

Set 3 of the input signals of curves a and b demonstrates the results of retriggering after the time $t_1$. At $t_{01}$, the $t_0$-$t_2$ period (curve g) and its complement (curve i) are restarted. The $t_1$-$t_2$ period (curve h) does not return to the low state but its timing is restarted. All outputs end at $t_2$.

The normal LOS operation will now be explained. For purposes of illustration the time window B of Table IV will be generated. Whenever all inputs to the gate 450 go high the output thereof will go low to feed gate 454 of flip-flop 453 thereby setting it. $t_0$ is taken at this time. Additionally, the gate 457 is enabled (since it is tied high) and goes low to enable counters 468 and 469 to count the clock frequency. Gate 454 also feeds (via line 476) the gate 475 of flip-flop 474. Whenever this second flip-flop 474 receives this signal from the first flip-flop 453, the second flip-flop 474 is cleared to recognize $t_1$ from eight-input AND gate 466. Thus, for example, to generate the time window B of Table IV (i.e., 0.2 to 1.6 seconds) and for purposes of illustration if an 80 pulse per secondclock is assumed (as derived from binary counter 485 and appropriate flip-flop circuits, not shown) it is seen that for a 0.2 second $t_1$ time (16 pulses per 80 cycle clock) it is necessary to jump the fifth output of counter 469 (via jumper $J_1$) to one of the inputs (input 5 for convenience) of AND gate 466. Additionally, a $t_2$ of 1.6 seconds (128 pulses per 80 cycle clock is derived by jumping the eighth output of counter 469 (via jumper $J_2$) to the eighth input of AND gate 465. Of course, it is to be understood that the above jumper connections are illustrative only. To generate the various other LOS time windows other jumper connections and/or combinations are necessary. Generally stated, the desired count, hence period, is determined by the counter outputs jumped to the gates 465 and 466. Gate 466 is used to detect the $t_1$ and gate 465 is used to detect $t_2$.

When the $t_1$ count is reached (since all the jumped inputs to gate 466 are high) the gate 466 wll go low thereby setting the second flip-flop 474. Flip-flop 474 drives the $t_1$-$t_2$ period outputs (via lines 480 and 481) to their $t_1$ level. Later in time the $t_2$ count will be reached (all the jumped inputs to gate 465 will go high) and the output thereof will go low. The low output of the gate 465 locks the gate 466 (via line 467) from recognizing a false count so that the second flip-flop 474 can be reset. Additionally, this output from gate 465 is fed to the first flip-flop 453 to reset it. The reset first flip-flop 453 drives the gate 457 which stops and zeroes the counters 468 and 469. Additionally, the reset flip-flop 453 ends the period of both $t_0$ - $t_2$ outputs (lines 482 and 483) and resets the second flip-flop (via line 476) which in turn ends the period of both $t_1$-$t_2$ outputs (lines 480 and 481).

In the retriggerable LOS the switch 479 is closed while the switch 478 is open and the capacitor 461 is placed in the circuit by closing of switch 460 and the opening of switch 469. In this case each time all the inputs to gate 450 go high and the output thereof goes low a negative transient signal is coupled through the capacitor 461 to the input of gate 457 thereby causing the output thereof to go high thus resetting the counters 468 and 469 to zero. This transient is sent only to the counters so after its passage the LOS continues counting. However, the count starts from zero. The closure of switch 479 and the opening of switch 478 permits the recognition of the coincidence of inputs up to time $t_2$ (as taken from gate 465) since the gate 450 is inhibited from recognizing the coincidence of inputs after $t_1$ when the switch 478 is utilized.

The fourth input to the input gate 450 is the stop signal. The overload signals generated in the preprocessor 41 from the overload logic 65 are sent to their respective range recognition logic where they are processed and fed to all the LOS's in that range logic (accordingly in FIG. 13 each of the LOS's therein are provided with input leads to receive the overload again). When the overload condition exists the stop signal falls to the zero level so than an input to the gate 450 goes low disabling the LOS. The stop signal is also fed to the gate 455 (via line 463) where it resets the first flip-flop 453 thereby stopping and resetting the counters 468 and 469 through the gate 457.

In order to generate the most accurate time periods five clock frequencies have been made available for use by the various LOS's in the recognition logic. These frequencies are 160, 80, 40, 20, and 10 cycles per second. The highest frequency clock capable of generating the desired period is chosen since the accuracy of the LOS is basically one count of the clock. Additionally, while the time windows $t_0$-$t_2$ and $t_0$-$t_2$ complement are not utilized in the R3H logic as shown by Table IV, in many cases in the other logic sections time windows are needed which begin at the time $t_0$. Accordingly, it is to be understood that the function of the LOS is to generate accurate time windows the start of which may or may not (as desired) be delayed in time with respect to the receipt of input enabling pulses.

Level Detector

The level detector of FIG. 16 is used to sense when a received analog signal reaches a predetermined level. The LD generages a digital "1" output as long as the received signal exceeds a set threshold level. The LD generates a "0" output when the signal falls below this set threshold level. The threshold is adjustable as will be discussed hereinafter. The LD functions as an interface component between the analog and digital circuitry in the recognition logic and accepts analog signals (i.e., primary features and/or filter channel energy or log energy) and translates them into a "1" or "0" signal level. The level detector comprises an operational amplifier 500 which may be a standard commercial item, as, for example, type NS 7560, manufactured by National Semiconductor Corporation. The analog input signal is fed to the noninverting input of the amplifier 500 through a resistor divider network comprising variable resistor 501 and resistor 502. A fixed negative voltage $-V_1$ is also fed to this divider network through a decoupling network comprising resistor 503 and capacitor 504 as well as attenuating resistor 505. A substantially unilateral impedance zener diode 506 is connected across the operational amplifier 500 in the feedback loop thereof to the inverting input terminal of the operational amplifier. Zener 506 is further connected at point 507 (the zener anode) to a resistor 508, the other side of which is grounded. Operating voltage is fed into the level detector from like magnitude positive and negative power supplies $\pm V_2$ at points A and B, respectively, through decoupling networks comprising resistors 509 and grounded capacitor 510.

Also connected to the operational amplifier 500 is a resistor 512 and/or a resistor 513, these resistors serving to balance the voltage offset of the operational amplifier. The phase of the amplifier 500 is compensated for by the phase compensation network comprising capacitor 514 in series with the resistor 515 and in combination with a capacitor 511.

Both the positive and negative output swings of the operational amplifier 500 are limited. Diode 516, the cathode of which is connected to the cathode of zener 506 and the anode of which is is connected to the LD output, serves to limit the negative output swing of the amplifier 500. Similarly, anode grounded zener 517 in combination with the resistor 518 (which is in parallel with the diode 516) serve to limit the positive output swing of the operational amplifier 500.

In operation, when the input signal increases from zero to its maximum level, the input to operational amplifier 500 across the resistor 502 varies from a slightly negative voltage to a positive voltage as a function of the resistance of variable resistor 501 and the magnitude of the bias supply $V_1$. The gain is determined principally by zener 506 and resistor 508 in the feedback loop and is controlled by the signal on the noninverting input of the amplifier 500. That is, the output of the amplifier 500, determined by the forward characteristics of zener 506 and the value of resistor 508, is usually negative but less so than the output voltage across resistor 502 (from $V_1$) with zero signal present. As the input signal increases in amplitude, however, the net input to the amplifier 500 goes less negative but the output still remains at approximately the same negative output voltage. When the input signal reaches a particular positive voltage or threshold, however, the input to the amplifier 500 approaches zero volts thereby causing it to go to a high gain state (i.e., the zener 506 becomes a high impedance when not forward biased). Thereafter, even a few millivolts increase in input signal causes the output to increase rapidly until the breakdown voltage of zener 506 is reached. At this point the zener 506 acts as a low impedance causing the gain of the amplifier to approach unity (excluding loading by the input network). If the input is further increased the output will increase the same amount the net input across resistor 502 increases. Thus when the analog input signal exceeds a preset threshold, the LD provides a positive output. This output is shaped by zener 517 to provide a digital "1". Similarly, with negative input signals or positive signals below the preset threshold, the LD provides a negative output shaped by diode 516 to provide a digital "0". As noted, the threshold level of the LD can be varied by varying resistor 501. In determining the value of the resistor 501 required to detect a given input signal level, the given signal level is assumed to be present at the input and the value of resistor 501 is calculated to yield zero volts across resistor 502.

Transition Detector

The transition detector of FIGS. 17 and 17a is a combination differentiator and threshold detector and is used to detect a change or transition in the primary features (i.e., slopes) or other analog signals. Whenever a transition is detected the circuit yields a digital "1" output. Conversely, when a transition is not present, the circuit yields a digital "0" output. Inasmuch as the TD receives analog input signals and provides digital output signals it may be thought as an analog-to-digital converter.

Many of the components of the transition detector are the same in structure and function as the level detector and, accordingly, have been identified with like numerals. More particularly, TD may comprise the standard operational amplifier 500 manufactured by National Semiconductor Corporation (NS 7560). Like amplitude, positive and negative operating voltage is applied at points A and B as shown through the decoupling networks comprising resistors 509 and capacitors 510. Diode 516 limits the negative output swing of the operational amplifier while the combination of resistor 518 and zener 517 limits the positive output swing. Similarly, capacitors 511 and 514 and resistor 515 provide phase compensation while the series combination of resistors 513 and/or 512 balance the voltage offset of the amplifier. Network gain is in this case determined by the zener diode 506 alone (resistor 508 is not present).

The input to the operational amplifier 500 of the transition detector, however, is substantially different from that of the level detector. More particularly, analog input signal is fed through a differentiating network comprising capacitor 525 in series with resistor 526 to the inverting input of the operational amplifier 500. An input bias current is also fed to this inverting input from an input bias circuit comprising the positive voltage source $V_1$ which feeds a decoupling network, comprising resistor 527 and capacitor 528, and a threshold adjusting resistor 529, which may be variable, and an attenuating resistor 530. Thus, the value of the current fed to the inverting input of the operational amplifier 500 is determined by the series combination of the ohmic values of resistors 529, 530.

As shown the transition detector will detect negative transitions or turnoffs in the slopes. It has been found in detecting submarine signals that this type of condition occurs much more frequently than positive transitions or turns ons. However, should it be desired to detect turn on information it is necessary only to replace at point 531 the decoupling network of FIG. 17 with that of FIG. 17a wherein a negative voltage source $-V_3$ and the capacitor 532 are utilized respectively in lieu of the positive voltage source $V_1$ and the capacitor 528. The polarity of the capacitors must be changed when polarity of voltage sources is changed.

In operation, and with no input signal being received at the input terminal, the bias current fed into the inverting input terminal of the amplifier 500 causes the output thereof to be driven negative sufficient to forward bias zener diode 506. This forward biasing balances the bias current at the inverting input terminal. If a positive going input signal is applied to this input terminal it will add to the bias current causing the output to change. However, this change is such that it increases the forward current through diode 506 and again balances the net input current. Thus the output of the amplifier remains fairly constant (at approximately $-0.7$ volts) for zero or rising input signals.

For negative going input signals, however, the signal current will tend to cancel the bias current. If the negative rate of change (i.e., the derivative as taken by the differentiating network comprising capacitor 525 and resistor 526) of the input signal is sufficient to completely cancel the bias current, the zener diode 506 will appear as a high impedance thereby placing amplifier 500 in a high gain condition. Thus, if a negative going rate of change of input signal is slightly greater than that required to offset the bias current, the output of the transition detector will rapidly rise. This will force reverse current through zener 506 in an attempt to balance the current at the inverting input terminal of operational amplifier 500. The output will rise to the breakdown voltage of the zener 506 (approximately three volts) in order to feed back this canceling current. If the rate of change of input signal is very fast the output will rise sufficiently to feed back enough current to cancel the net input current. Depending on the sharpness of the zener breakdown, the faster rate of change input signals will have little effect on the output voltage. It should be noted that the bias current or threshold of the transition detector may be set by varying resistor 529. Increasing the resistor decreases the bias current and results in the detection of smaller rate of fall transitions.

Should it be desired to detect transitions in the positive slopes, the bias circuit of FIG. 17a is used as indicated hereinabove in lieu of the bias circuit of FIG. 17. With this slight modification positive going transitions will be detected in the same manner as the aforediscussed negative transitions. When the modification of FIG. 17a is utilized in the recognition logic, however, a NAND gate should be connected to the TD output so that the state of the output signal is identical with that of the TD of FIG. 17 so that the remaining logic components can accommodate it.

As noted hereinabove, the transition detector is intended to supply digital logic. However, the output levels of the amplifier 500 may not meet the input requirements of that logic. Thus the diode 516 is utilized to limit the negative swing of the output signal. More particularly, diode 516 converts the nominal −0.7 volt output signal to about −0.3 volt output signal thereby more closely approximately a zero output condition. If the breakdown of diode 506 is sharp enough then a "1" condition (i.e., an output voltage between 2 volts and 5.5 volts will be met). Accordingly, diode 506 may be selected such that the "knees" of its voltage-current curve are sufficiently sharp as to require no additional limiting. Alternatively, the resistor 518 and zener 517 may be added to the circuit to provide sufficient "1" condition drive for the digital circuitry since the diode 516 has a high impedance.

Output One-Shot (OOS)

Referring now to FIG. 18 the output one-shot will now be described. The output one-shot comprises a monolithic, silicon epitaxial, integrated circuit, monostable multivibrator of the type such as, for example, manufactured by Fairchild Semiconductor Corporation commercially available under the part number VTμL951. The output one-shot with its integrated circuit monostable multivibrator 550 is used to indicate decisions from the recognition logic. A source of supply +V₁ is connected through an inductor 551 to one of the inputs of the monostable multivibrator 550. The other side of the inductor 551 is also connected at the point 553 to the plus side of a grounded polarized capacitor 552 and further connected to one side of a resistor 554. The other side of resistor 554 is connected to the negative ends of two paralleled, polarized capacitors 555 and 556, these capacitors being connected across a second and a third input of the monostable multivibrator 550.

The period of the output one-shot (duration of the output pulse thereof) is determined by the time constant of resistor 554 and the two paralleled capacitors 555 and 556. For each range recognition logic a different period is utilized to identify the range. This is accomplished by varying capacitor 555 to achieve time constants of 1.0, 1.5, 2.0, and 2.5 seconds, corresponding, respectively, to ranges 1, 2, 3, and 4.

Connected to the positive terminal of the capacitors 555 and 556 is the emitter of a transistor 557, the base of which is connected to a fourth input of multivibrator 550, and the collector of which is connected through a resistor 558 to the complementary output of the output one-shot. The base of the transistor is also connected at the point 559 to the complementary output of the output one-shot. Connected to the collector of transistor 557 at the point 560 and through an inductor 561 is a second source of voltage +V₂. Also connected to the point 560 is the positive terminal of a second grounded capacitor 552. In general, the magnitude of V₂ should be greater than that of V₁. The signal input to the output one-shot is taken at point A (as shown) and the two outputs (actually the output and its complement) are taken at the points B and C, also as shown.

Operationally, when the input signal to the output one-shot at the point A goes low, the OOS period begins. The period of the OOS is determined by the time required to charge capacitors 555 and 556 through the resistor 554. When the period begins transistor 557 is kept off since the complementary output applied to its base back biases the emitter-base junction. Therefore, the charging path of the capacitors 555 and 556 is into the monostable multivibrator 550 through the line 562. However, at the end of the period, capacitors 555 and 556 must be discharged before a second period can be timed or the second period will be effected by the remaining charge on the capacitors 555 and 556. Accordingly, at the end of a period, when the complementary output goes high this turns on the transistor 557 by forward biasing the emitter-base junction. When this occurs, the capacitors 555 and 556 will discharge rapidly to ground through the path determined by the transistor 557, the capacitor 552 and to a grounded terminal within the monostable multivibrator through the line 563.

It should thus be seen that the transistor 557 is added to increase the OOS's period stability at high duty cycles. The multivibrator by itself only permits a 50% duty cycle for a 3% change in period. The OOS with the charging transistor permits up to a 96% duty cycle with only a 3% change in period. This allows rapid discharge of the capacitor 555 so that it is free to accept charge and thereby time a second period, the charge from the first period no longer having effect on the circuit performance.

Remaining Logic Features

The R3H logic and the various elements utilized therein have been explained. The following logic feature information is provided so that the remaining logic components may be fabricated. The occurrence of the events listed below uniquely determines the criteria necessary for recognition by the remaining logic components. Table V below shows the various time windows (in seconds) for the LOS's of the remaining logic components.

TABLE V

Time Windows for Remaining LOS's

| Recognition Logic | Symbol | Time Window (Sec) | Recognition Logic | Symbol | Time Window (Sec) |
|---|---|---|---|---|---|
|  |  |  | R2L | A | .81–1.28 |
|  |  |  |  | B | .55–.96 |
|  |  |  |  | C | .46–1.03 |
|  |  |  |  | D | 1.75–2.38 |
| R4L | A | .86–1.74 |  | E | 1.26–1.50 |
|  | B | .58–1.2 |  | F | 1.21–1.49 |
|  | C | .42–1.0 | R2M | A | .71–1.29 |
|  | D | .2–2.06 |  | B | .70–1.26 |
| R4M | A | .55–1.68 |  | C | .45–1.26 |
|  | B | .36–1.34 |  | D | 2.75–3.85 |
|  | C | 1.26–1.97 |  | E | 0–.62 |
|  | D | 4.26–8,9 |  | F | .74–.741 |
|  | E | 1.94–4.2 |  | G | 2.15–3.10 |
|  | F | 1.05–3.0 | R2H | A | .35–.58 |
|  | G | .86–2.28 |  | B | .31–.84 |
|  | H | .75–2.4 |  | C | 1.63–2.10 |
|  | I | 2.5–3.1 |  | D | 2.27–5.30 |
| R3L | A | .75–1.7 |  | E | 1.92–3.25 |
|  | B | .5–1.0 |  | F | .89–1.65 |
|  | C | .35–1.0 |  | G | .94–1.84 |
|  | D | .6–1.42 |  | H | .64–1.75 |
| R3M | A | 0–1.6 |  | I | 1.60–2.10 |
|  | B | 0–1.53 | R1M | A | 0–2.2 |
|  | C | 0–1.96 |  | B | 0–5.0 |
|  | D | .7–2.2 |  | C | 0–1.0 |
|  | E | .75–1.25 |  | D | 0–12.8 |
|  | F | .4–2.35 | R1H | A | .37–1.41 |
|  | G | 13.2–16.8 |  | B | .375–2.20 |
|  | H | 0–1.6 |  | C | 0–1.90 |
|  | I | 1.6–3.6 |  | D | .42–2.75 |
|  | J | 2.0–3.9 |  |  |  |

R4L

After a transition in the slope of negative channel 10 there appears successively a transition in negative channel 8 during the time window A, a transition in negative channel 6 coincident with the presence of energy in negative channel 10 during the time window B, a transition in negative channel 4 during the time window C, and the coincidence of the presence of energy in negative channel 2 with positive slopes appearing in channels 4, 5, and 6 and the absence of energy in positive channel 3, all this during the time window D.

R4M

After a transition in negative channel 8 there occurs a transition in negative channel 6 during the time window A followed by a transition in negative channel 4 during the time window B. This is followed by the coincidence of positive slopes in channels 3, 4, 5, and 6 during the time window C. This coincidence initiates the time window D during which time there appear transitions successively in negative channels 10, 8, 6, and 4, these transitions occurring respectively in time windows E, F, G, and H where time window E is initiated by the transition of energy in negative channel 6, as indicated heretofore. It is required that the second channel 4 transition occurs during time windows D and H. This occurrence initiates the time window I within which there appears the coincidence of positive slopes in channels 4 and 5.

R3L

After a transition in negative channel 10 there appears a transition in negative channel 8 during the time window A, followed by a transition in negative channel 6 coincident with the presence of energy in negative channel 10 during the time window B. Thereafter, there appears a transition in negative channel 4 during the time window C followed by a transition in negative channel 2 coincident with the presence of positive slopes in channels 4, 5, and 6 and the absence of energy in channel 3, this during the time window D.

R3M

After the presence of energy in positive channel 7 there appears the presence of energy in channel 6 during the time window A, followed by the presence of energy in channel 4 during the time window B, followed by the presence of energy in channel 3 during the time window C. There also appears a transition in negative channel 8 followed thereafter by a transition in negative channel 6 during the time window D. This is followed by a transition in negative channel 4 during the time window E followed by a transition in negative channel 2 during the time window F. The requirement is that the time window C and the time window F end simultaneously. This simultaneous event initiates the time window G during which time there occurs a positive slope in channel 7 followed by a positive slope in channel 6 during the time window H. This is followed by a turn on in positive channel 4 during the time window I followed by a turn on in positive channel 2 during the time window J where the time periods J and G end simultaneously.

R2L

Upon the coincidence of a slope in positive channel 2 and a transition in negative channel 10 there occurs a transition in negative channel 8 during the time window A, followed by a transition in negative channel 6 during the time window B. This is followed by the coincidence of a transition in negative channel 4, the presence of energy in negative channel 10, and the presence of slopes in positive channels 5, 6, and 7 during the time window C. Thereafter, this is followed by the coincidence of slopes in positive channels 5, 6, and 7 and the presence of energy in the negative slope of channel 10 during the time window D where the D time window is initiated by the ending of time window A such that time windows B and C occur within the time window D. This is followed by a transition in negative channel 8 during the time window E followed thereafter by the coincidence of a transition in negative channel 6 and positive slopes in channels 7 and 8 during the time window F.

R2M

After the coincidence of a transition in negative channel 10 and the presence of a slope in positive channel 2, there occurs a transition in negative channel 8 during the time window A followed by a transition in negative channel 6 during the time window B. This is followed by the coincidence of a turnoff in negative channel 4, the presence of positive slopes in channels 5, 6, and 7 and the absence of energy in channels 2, 3, and 4 during the time window C. Thereafter there occurs the coincidence of a transition in negative channel 10 and the presence of slopes in positive channels 2–6, inclusive, during the time window D where the time window D is initiated at the end of the time window A such that the time windows B and C occur within the time window D. At the end of time window D there occurs the coincidence of the presence of positive slopes in channels 2–6, inclusive, during the time window E. This is followed by the coincidence of positive slopes in channels 2–5, inclusive, during the time window F. There is also a time window G which is initiated at the end of time window C such that the time windows E and F occur therewithin, window F ending simultaneously with window G.

R2H

After a transition in negative channel 9, there occurs a transition in negative channel 8 during the time window A, followed by a transition in negative channel 6 during the time window B. This is followed by the coincidence of positive slopes in channels 2–6, inclusive, during the time window C. The time window D is initiated at the end of time period C. During the D window there occurs a transition in negative channel 6. This transition occurs during the time window E. Time window E, in addition to being within time window D, begins at the end of time window A such that time windows B and C occur therewithin. After the transition in negative channel 6, there occurs a transition in negative channel 8 during the window F, followed by a transition in negative channel 6 during the window G. This is followed by a transition in negative channel 4 during the time window H such that time window H ends simultaneously with the ending of window D. There next follows the coincidence of positive slopes in channels 2–5, inclusive, and the absence of energy in positive channel 6 during the time window I.

R1M

After the presence of a positive slope in channel 6 there occurs the coincidence of positive slopes in channels 7 and 8 during the time window A. Thereafter, there occurs the coincidence of positive slopes in channels 2, 4, and 5 during the window B. The occurrence of a zero crossing in channel 8 during the window C follows thereafter where window C occurs within window B. Additionally, for recognition to occur it is required that the log of the energy in positive channel 11 and the energy in channel 4 remain below preset thresholds as determined by level detectors. Accordingly, these channels are continuously monitored. It is also necessary that the short-term integral of the log of the energy in positive channel 9 minus the long-term integral of the log of the energy of channel 9 exceeds a preset threshold. These long-term and short-term integrals are obtained by integrating the channel 9 log energy over a fifteen second time interval (long-term) and a one second time interval (short-term). The difference therebetween is then taken. This difference information together with the other above-mentioned R1M information may be fed to a NAND gate (the output of which is connected to an OOS) for the time period D.

R1H

A peak of the energy in channel 9 initiates the time window A during which, if a zero crossing in channel 9 is detected, the time window B is initiated. If during this window there is a cross over in channel 6 a time window C is initiated. If during the time window C there is a second peak in channel 9 the time window D is initiated. If during window D there is a second cross over in channel 9 the output thereof is fed to an output one-shot.

It is noted that appropriate circuits may be needed to detect the aforementioned peaks and cross overs. Such a peak detection circuit should be more sensitive to short-period peaks of energy in channel 9 (as would be caused by a submarine signal) than to the longer energy peaks due to geologic noise. Similarly, the zero level energy cross overs may be detected by taking the derivative of the log of the energy in the channel and then threshold detecting it. This is because the maximum rate of change of energy in sinusoidal-like signals is near the zero level crossing and the threshold may be adjusted to detect the zero crossing high rate of change portion of the energy in a channel.

Sample and hold circuits and low pass filters (not shown) are incorporated within range 1 logic to form analog signals from the multiplexed energy and log compressed energy.

Resume

It has been shown that the feature recognition system of the present invention receives amplitude-time domain MAD information which may or may not contain a magnetic anomaly signal from a submarine. This information is first broadband filtered and thereafter narrowband filtered to form filter channels of amplitude-time-frequency MAD energy. The narrowband filter information (which occurs within the passband of the broadband filter) is sequentially multiplexed, range amplified into four ranges, and summed. Thereafter it is full-wave rectified and log compressed. The log compressed information is feature abstracted such that the primary feature positive and negative slopes of the multiplexed filter channel information is obtained. This abstracted information is then demultiplexed and thereafter held for a sample period by the sample and hold circuits. After being held, the primary feature abstracted information is supplied to decision and recognition logic wherein the relative presence of invariant submarine recognition features is searched for. Also, as noted heretofore, the range 1 information, in addition to having the primary features thereof abstracted, is supplied to the recognition and decision logic both in its channel energy and log compressed channel energy forms.

If the conditions for recognition are present, a decision is indicated and routed to a visual display. Conversely, if the conditions for recognition are not present, no decision is indicated. Moreover, even if the received amplitude-time information exhibits primary feature characteristics similar to those of a submarine, if the relative amplitudes thereof exceed a predetermined level an overload signal is generated to inhibit recognition.

It should now be apparent that an airbourne craft equipped with the feature recognition system comprising the present invention may be utilized to search for and detect submarines upon receiving MAD amplitude-time signals therefrom and by thereafter both abstracting amplitude-time-frequency signals from the MAD signals to form primary features and recognizing and detecting the relatively invariant submarine features exhibited thereby irrespective of the presence of signal-like noise.

In use, a pilot may fly along a particular flight path at a predetermined altitude and if a detection is achieved, the pilot may increase or decrease his altitude to another predetermined altitude whereupon he may again look for that same submarine. In this manner, the pilot may continue to refly the same flight path at various altitudes until a recognition is indicated throughout the various ranges. Of course, the greater the number of recognitions, especially in the high probability of detection cases, the more probable is the presence of a submarine.

Obviously many modifications and variations of the present invention are possible in the light of the above teachings. It is therefore to be understood that within the scope of the appended claims the invention may be practiced otherwise than as specifically described.

What is claimed is:

1. A feature recognition system comprising:
   first means for converting signals and signal-like noise in the amplitude-time domain into amplitude-time-frequency domain signals;
   second means receiving said amplitude-time-frequency domain signals for abstracting primary features therefrom and for automatically recognizing the relative presence of invariant recognition features associated with said primary features; and
   overload logic means operatively connected to said first means for providing disabling and resetting signals to said second means responsive to an overload condition appearing in said first means and sensed by said overload logic means.

2. A feature recognition system comprising:
   first means for converting signals and signal-like noise in the amplitude-time domain into amplitude-time-frequency domain signals;
   second means receiving said amplitude-time-frequency domain signals for abstracting primary features therefrom and for automatically recognizing the relative presence of invariant recognition features associated with said primary features;
   pulse generating means; and
   timing logic means operatively connected to said pulse generating means for providing control timing signals to said first means and said second means.

3. A feature recognition system comprising:
   first means for converting signals and signal-like noise in the amplitude-time domain into multiplexed sequentially sampled amplitude-time-frequency domain signals; and
   second means receiving said multiplexed sequentially sampled amplitude-time-frequency domain signals including a multiplexed feature abstractor means operatively connected to said first means for abstracting primary features at a controlled rate and said second means further automatically recognizing the relative presence of invariant recognition features associated with said primary features including the positive and negative slopes of said signals in the amplitude-time-frequency domain.

4. A feature recognition system according to claim 3 wherein said first means comprises:
   first filter means receiving said amplitude-time domain signals and having a predetermined passband;
   a plurality of second filter means, each having a different passband and center frequency positioned within the passband of said first filter means and operatively connected thereto for converting said amplitude-time domain signals into said amplitude-time-frequency domain signals; and
   a plurality of filter channels, each of said channels containing one of said plurality of second filter means, whereby said amplitude-time-frequency domain signals are sorted into said channels.

5. A feature recognition system according to claim 4 wherein said first means further comprises:
   multiplexing means operatively connected to said second filter means for sequentially sampling said amplitude-time-frequency domain signals at a controlled rate;
   a plurality of amplifier means operatively connected to said multiplexing means and each having different predetermined gains for amplifying said sequentially sampled signals;
   a plurality of amplifier ranges, each of said ranges containing one of said plurality of amplifier means, whereby said sequentially sampled signals are sorted into said ranges; and
   summing means operatively connected to said amplifier means for summing said amplified signals.

6. A feature recognition system according to claim 5 wherein said first means further comprises:
   full-wave rectifier means operatively connected to said summing means for rectifying the signals supplied thereto from said summing means; and
   log compressing means operatively connected to said rectifier means and receiving said rectified signals for dynamically compressing the range thereof and providing an output to said multiplexed feature abstractor means.

7. A feature recognition system according to claim 6 wherein said second means comprises:
   demultiplexing means operatively connected to said abstractor means for demultiplexing said abstracted primary features responsive to the receipt thereto of control timing signals; and
   sample and hold means connected to said demultiplexing means for storing the demultiplexed abstracted primary features for predetermined time periods.

8. A feature recognition system according to claim 7 wherein said second means further comprises:
   recognition and decision logic means operatively connected to said sample and hold means and receiving at a controlled rate said stored, abstracted primary features for automatically recognizing during predetermined time windows the relative presence of invariant recognition features associated with said stored, abstracted primary features.

9. A feature recognition system according to claim 8 wherein:
   said recognition and decision logic means is further operatively connected to said full-wave rectifier means and said log compressing means for automatically recognizing during said predetermined time windows the relative presence of invariant recognition features associated with the output signals respectively provided by said rectifier means and said log compressing means.

10. A feature recognition system according to claim 9 wherein:
    the relative presence of said invariant recognition features is a function of preselected degrees of probable occurrences of expected events.

11. A feature recognition system according to claim 8 wherein:
    the relative presence of said invariant recognition features is a function of preselected degrees of probable occurrences of expected events.

12. A feature recognition system according to claim 8 wherein said recognition and decision logic means includes:
    logic means responsive at least to selected portions of said stored, abstracted primary features for providing digital output signals during said predetermined time windows, said logic means generating said time windows a first preselectable time after the enablement thereof and terminating said time windows after a second preselectable time.

13. A feature recognition system according to claim 12 wherein:
said means providing said digital output signals during said time windows may be retriggerable or nonretriggerable.

14. A feature recognition system according to claim 12 wherein said recognition and decision logic means further includes:
amplitude responsive means receiving selected portions of said stored, abstracted primary features for providing high digital output signals when the amplitudes of said features exceed a preselectable threshold level and for providing low digital output signals when the amplitude of said features do not exceed said preselectable threshold level.

15. A feature recognition system according to claim 14 wherein said recognition and decision logic means further includes:
differentiator and threshold detector means receiving selected portions of said stored, abstracted primary features for detecting transitions therein, said means providing high digital output signals upon detecting said transitions and low digital output signals in the absence of detecting said transitions.

16. A feature recognition system according to claim 15 wherein said recognition and decision logic means further includes:
means having preselectable duty cycles and including monostable multivibrator means for routing to a display decision signals indicating recognitions of the relative presence of said invariant recognition features upon said means receiving at the respective inputs thereof the coincidence of digital signals for time periods equal to said preselectable duty cycles.

17. A feature recognition system according to claim 16 wherein:
said means including monostable multivibrator means receives said digital signals from said logic means, said amplitude responsive means, and said differentiator and threshold detector means; and
said display presents visual indications of said decision signals.

* * * * *